US010664527B1

(12) United States Patent
Henderson et al.

(10) Patent No.: US 10,664,527 B1
(45) Date of Patent: May 26, 2020

(54) RESPONSE RETRIEVAL SYSTEM AND METHOD

(71) Applicant: PolyAI Limited, London (GB)

(72) Inventors: Matthew Steedman Henderson, Singapore (SG); Pei-Hao Su, London (GB); Nikola Mrksic, London (GB); Tsung-Hsien Wen, London (GB); Inigo Casanueva Perez, London (GB); Ivan Vulic, London (GB); Georgios Spithourakis, London (GB); Samuel John Coope, London (GB); Pawel Budzianowski, London (GB); Daniela Susanne Gerz, London (GB)

(73) Assignee: PolyAI Limited, London (GB)

( * ) Notice: Subject to any disclaimer, the term of this patent is extended or adjusted under 35 U.S.C. 154(b) by 0 days.

(21) Appl. No.: 16/251,677

(22) Filed: Jan. 18, 2019

(51) Int. Cl.
*G06F 7/00* (2006.01)
*G06F 17/30* (2006.01)
*G06F 16/9032* (2019.01)
*G06F 16/33* (2019.01)
*G06F 16/538* (2019.01)

(52) U.S. Cl.
CPC .... *G06F 16/90332* (2019.01); *G06F 16/3334* (2019.01); *G06F 16/3347* (2019.01); *G06F 16/538* (2019.01)

(58) Field of Classification Search
None
See application file for complete search history.

(56) References Cited

U.S. PATENT DOCUMENTS

| | | | | |
|---|---|---|---|---|
| 2008/0077642 | A1* | 3/2008 | Carbone | G06F 16/9537 709/203 |
| 2009/0055392 | A1* | 2/2009 | Gupta | G06F 16/9535 |
| 2015/0293976 | A1* | 10/2015 | Guo | G06F 16/248 707/706 |
| 2017/0186032 | A1* | 6/2017 | Rangasamy Kannadasan | G06Q 30/0248 |
| 2018/0107642 | A1* | 4/2018 | Gliozzo | G06F 16/3322 |

(Continued)

OTHER PUBLICATIONS

Al-Rfou, Rami et al., "Conversational Contextual Cues: The Case of Personalization and History for Response Ranking" arXiv:1606.00372v1 [cs.CL] Jun. 1, 2016; pp. 1-10.

(Continued)

*Primary Examiner* — Tuan A Pham
(74) *Attorney, Agent, or Firm* — Bracewell LLP; Christopher L. Drymalla

(57) ABSTRACT

A method of obtaining a response to a query inputted by a user, the method comprising:
  receiving a user inputted query;
  encoding said query to produce a context vector;
  retrieving responses with associated response vectors;
  scoring response vectors in the database against the context vector wherein the scoring is a measure of the similarity between the context vector and a response vector; and
  outputting the responses with the closest response vectors,
  wherein encoding said query to produce a context vector comprises using a pre-trained model, wherein said pre-trained model has been trained using corresponding queries and responses such that an encoding is used that maximises the similarity between the response vector and context vector for a corresponding query and response.

16 Claims, 19 Drawing Sheets

(56) References Cited

U.S. PATENT DOCUMENTS

2018/0267976 A1* 9/2018 Bordawekar .......... G06N 20/00
2019/0205301 A1* 7/2019 Ni ..................... G06F 16/24522

OTHER PUBLICATIONS

Banchs, Rafael E. et al., "IRIS: a Chat-oriented Dialogue System based on the Vector Space Model" Proceedings of the 50th Annual Meeting of the Association for Computational Linguistics, Republic of Korea, Jul. 8-14, 2012; pp. 37-42.

Bartl, Alexander et al., "A retrieval-based dialogue system utilizing utterance and context embeddings" arXiv"1710.05780v3 [cs.CL], Oct. 20, 2017; pp. 1-8.

Cer, Daniel et al., "Universal Sentence Encoder" arXiv:1803.11175v2 [cs.CL], Apr. 12, 2018; pp. 1-7.

Chaudhuri, Debanjan et al., "Improving Response Selection in Multi-turn Dialogue Systems by Incorporating Domain Knowledge" arXiv1809.03194v3 [cs.AI], Nov. 5, 2018; pp. 1-11.

Devlin, Jacob et al., "BERT: Pre-training of Deep Bidirectional Transformers for Language Understanding" arXiv:1810.04805v1 [cs.CL], Oct. 11, 2018; pp. 1-14.

Henderson, Matthew et al., "Efficient Natural Language Response Suggestion for Smart Reply" arXiv:1705.00652v1 [cs.CL], May 1, 2017; pp. 1-15.

Howard, Andrew G. et al., "MobileNets: Efficient Convolutional Neural Networks for Mobile Vision Applications" arXiv:1704.04861v1 [cs.CV] Apr. 17, 2017; pp. 1-9.

Ji, Zongcheng et al., "An Information Retrieval Approach to Short Text Conversation" arXiv:1408.6988v1 [cs.IR], Aug. 29, 2014; pp. 1-21.

Kannan, Anjuli et al., "Smart Reply: Automated Response Suggestion for Email" KDD '16, Aug. 13-17, 2016, San Francisco, CA; pp. 1-10.

Radford, Alec et al., "Improving Language Understanding by Generative Pre-Training" Preprint. Work in progress. available at: https://openai.com/blog/language-unsupervised/ dated Jun. 11, 2018; pp. 1-12.

Song, Yiping et al., "An Ensemble of Retrieval-Based and Generation-Based Human-Computer Conversation Systems" Proceedings of the 27th International Joint Conference on Artificial Intelligence, 2018 (IJCAI-18); pp. 4382-4388.

Svenstrup, Dan et al., "Hash Embeddings for Efficient Word Representations" 31st Conference on Neural Inforamtion Processing Systems (NIPS 2017), Long Beach, CA; pp. 1-9.

Wu, Yu et al., "Sequential Matching Network: A New Architecture for Multi-turn Response Selection in Retrieval-Based Chatbots" arXiv:1612.01627v2 [cs.CL] May 15, 2017; pp. 1-10.

Yan, Rui et al., "Learning to Response with Deep Neural Networks for Retrieval-based Human-Computer Conversation System" SIGIR '16, Jul. 17, 21, 2016, Piza, Italy; pp. 55-64.

Yang, Yinfei et al., "Learning Semantic Textual Similarity from Conversations" arXiv:1804.07754v1 [cs.CL], Apr. 20, 2018; pp. 1-10.

Zhou, Xiangyang et al., "Multi-Turn Response Selection for Chatbots with Deep Attention Matching Network" Proceedings of the 56th Annual Meeting of the Association for Computational Linguistics; Jul. 15-20, 2018, Australia; pp. 1118-1127.

* cited by examiner 601   603   605   607

1001

1001

US 10,664,527 B1

RESPONSE RETRIEVAL SYSTEM AND METHOD

FIELD

Embodiments described herein relate to response retrieval systems and methods.

BACKGROUND

Response retrieval systems such as computer implemented dialogue systems are provided in many situations. For example, telephone help systems, chat bots, customer service, e-banking etc.

Typically dialogue systems are constructed around rigid ontologies, where conversations are modelled as a sequence of actions that constrain slots to certain values.

This method of modelling dialogue presents two main challenges. Firstly, it is difficult to collect data labelled with these explicit semantic representations. Secondly, it constrains the types of dialogue the system can support, resulting in artificial conversations, and breakdowns when the user does not understand what the system can and cannot support.

BRIEF DESCRIPTION OF FIGURES

Embodiments described herein will now be described with reference to the following figures.

DETAILED DESCRIPTION OF FIGURES

Figure 1:
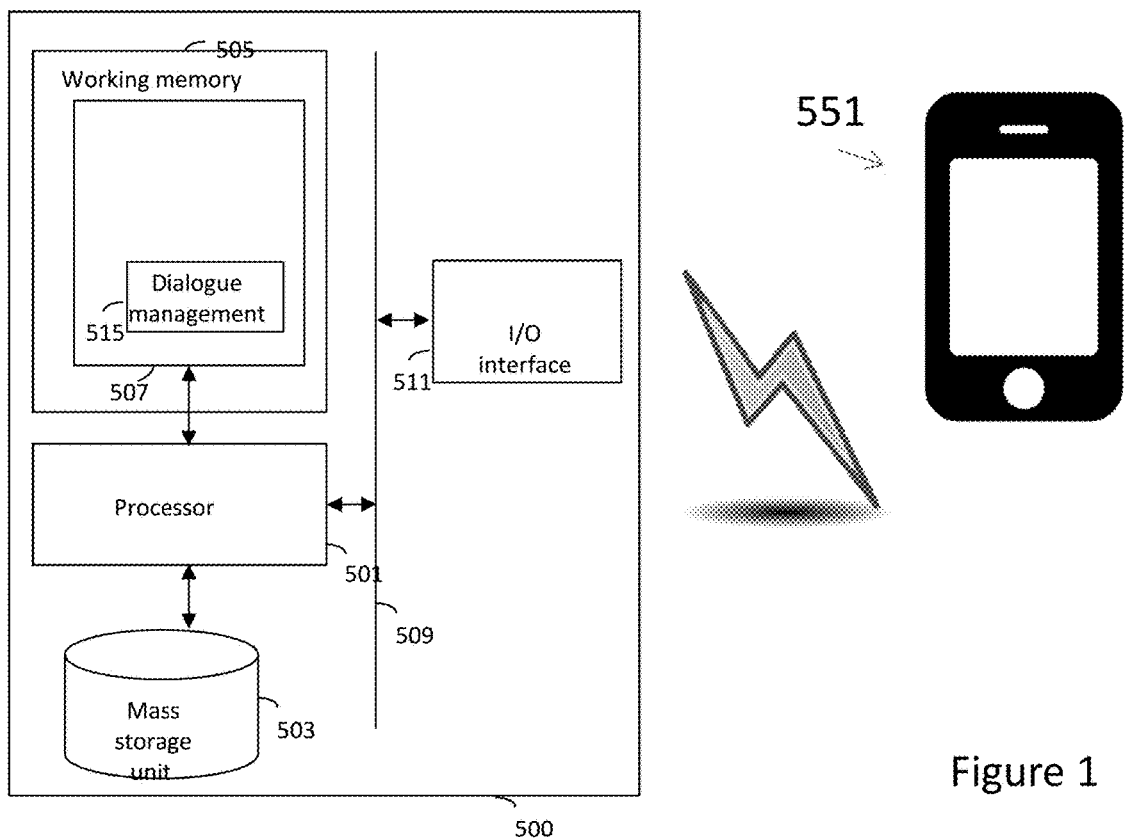
FIG. 1 is a schematic of a system in accordance with an embodiment.

In an embodiment, a response retrieval method is provided of obtaining a response to a query inputted by a user, the method comprising:

receiving a user inputted query;

encoding said query to produce a context vector;

retrieving responses with associated response vectors from a database;

scoring response vectors in the database against the context vector wherein the scoring is a measure of the similarity between the context vector and a response vector; and visually outputting the responses with the closest response vectors, wherein encoding said query to produce a context vector comprises using a pre-trained model, wherein said pre-trained model has been trained using corresponding queries and responses such that an encoding is used that maximises the similarity between the response vector and context vector for a corresponding query and response.

In the above embodiment, the system retrieves possible responses from a database. Thus there is no need for the system to construct the response from basic components using a language model or the like.

From a reverse perspective, the above embodiment can also be viewed as a dialogue system which operates solely on the basis of retrieving relevant in-context responses given the users' (free) utterances.

The disclosed system provides an improvement to computer functionality by allowing computer performance of a function not previously performed by a computer. Specifically, the disclosed system provides for the retrieval of suitable responses without the need to rely on building a response from smaller units. The system achieves this by providing a model to encode a query to produce a context vector; this context vector is then compared to response vectors that have been derived for possible responses. The response vectors are derived from responses using a model. The responses with the most similar vectors to the context vector are provided for the response. The model that maps the query to the context vector and the model that maps a response to its response vector are jointly trained. The training data comprises known query and response pairs and the model is trained to maximise the similarity between corresponding queries and responses. After training the system can continually add to its database of response vectors as responses are received by the system. For example, if the system is a travel recommendation system, then users' reviews of restaurants etc can be offline converted to response vectors, using the pre-trained model to continually increase the range of possible responses.

The system also addresses a technical problem tied to computer technology and arising in the realm of computer networks, namely the technical problem of slow processing. The disclosed system solves this technical problem by allowing the responses of possible response vectors to be stored and thus retrieval of these vectors is less heavy on processing load than constructing an answer. Also, the ability to offline produce and store response vectors for new responses allows the system to be continually updated without affecting performance.

In the above embodiment, the retrieval of suitable/relevant responses occurs in the conversational context. The response-based system enables the following important technical features:

1) pre-computing response vectors prior to inference time, which leads to very quick similarity computations and response ranking; the pre-computation of response vectors enables encoding new system responses without retraining the entire system. This implies a higher degree of scalability;

2) a response vector can be encoded independent of other response vectors and therefore, is possible to parallel process the encoding of the response vectors using a GPU or the like;
3) by formulating a dialogue system for searching scenarios as a response retrieval system, it is no longer necessary to collect and annotate expensive training data for training task-based dialogue systems; by bypassing any explicit definition of task/domain semantics from domain ontologies, the model can be deployed without the expensive data collection step to many searching scenarios;
4) Using an open-domain model trained on general text (Reddit) to power a specific domain (restaurant search, FAQ search, movie tickets search)

The embodiments described herein exploit a model trained on millions of examples of real conversations, using an implicit representation of semantics that directly optimizes the task at hand. The above embodiment retrieves a response from a database and does not, in one embodiment, semantically construct a response. Therefore, the computing power required to extract a response is very low and a response can be easily retrieved.

The above embodiment is well suited to situations where a user is looking to find out what other users have said, for example, in one embodiment, the system is adapted for use in an application relating to travel, restaurant recommendations etc. However, the query/response retrieval-based technology described herein can form the backbone of systems in other domains and other searching scenarios where a similar dialogue-through-retrieval paradigm can be applied. For example, online shopping (searching for products on e-retail websites), customer services for banking applications or other chatbot based systems.

In an embodiment, the method is applied to a restaurant search task, but the same methodology is equally applicable to any other search scenarios (for example, mining FAQ question databases, or search for movies when supplemented with other data).

It should be noted that in an embodiment, the system is not only used to explore what other users have said about items/entities from a database, but also to constantly narrow down the list of relevant items/entities (e.g., restaurants) through response-based dialogue according to the criteria mentioned by the user throughout the dialogue.

The response is a visual response and may be phrase and/or an image. Thus the system is capable of modeling multi-modal/visual responses conditioned on the conversational context.

The model learns from millions of examples what responses are appropriate in different conversational contexts. The model is used to rank a large index of responses that are known to be relevant, e.g., snippets and photos from reviews about a restaurant. The system then presents the responses visually to the user. As a result there is no need to engineer a structured ontology, or to solve the difficult task of general language generation. The model naturally deals with all possible natural language queries. Note there are domains where an explicit slot-value structure is necessary (e.g. booking, where the system needs to gather certain details), however visual response demonstrates that (restaurant) browsing and question answering is not such a domain.

It should be noted that in this embodiment, searching tasks (e.g., restaurant search) can be handled without explicitly defined semantic specification of the task through domain ontologies. Searching tasks are typically also handled by (expensive-to-build) modular task-based systems that require all the modules in the pipeline (Spoken Language Understanding, Belief State Tracking, Dialogue Management, Natural Language Generation). The above response-based system does not require any of the modules and operates directly on the basis of utterance-response exchange.

When it comes to booking, the booking is still realised as a standard modular task-based dialogue system, but booking scenarios have more restricted semantics than more free-wheeling search scenarios.

However, in an embodiment, through a dedicated classifier mentioned later in the text, the user can be helped to enter the booking phase after the response-based search phase.

In summary, once the user fixes a desired entity in the search phase (i.e., once the user selects a restaurant), in the booking phase, the system has to collect the following mandatory booking information from the user before proceeding with the reservation:
1) date,
2) time,
3) number of people to dine.

Once all the info is collected, the system attempts to make a booking and informs the user about success/failure of the attempt While conventional slot-based systems train several tiny models on a small amount of data, visual response uses one large model trained on many examples, making it easier to maintain. Adding capabilities to the system reduces to adding new types of response candidates—a much easier task than changing ontologies, collecting new training data and training new models. The large ranking model encapsulates a lot of knowledge about natural language and conversational flow.

The above exploits retrieval and ranking to browsing & question answering and provides a fast multi-modal retrieval-based model which enables narrowing down search to a single entity by simulating conversation through retrieval of relevant responses.

By incorporating images into the model, it is possible to project images into a conversational response space. In some embodiments, photos are used as responses by learning a shared multi-modal space where previous contextualised user utterance as well as photos (linked to it through their captions in training data) are represented.

Related to 1) and 2) is also the trick to link responses to photo captions through the shared function g which is first optimised on the open-domain Reddit data, and then fine-tuned on the domain-specific caption-photo data.

The above training methods allow an open-domain model trained on general text (e.g. Reddit) to power a specific domain, by constraining its search space.

Also, it is possible to extract dialogue response generation through simple templates to provide also textual/speech feedback to the user along with the photos ("One diner at _ wrote "_")

In further embodiments, discrete intent classification is possible for restarting the dialogue state: binary text classifiers with seed sets and active learning.

FIG. 1 is a schematic of a system in accordance with an embodiment of the invention. System comprises a mobile telephone 551 as a user interface. However, the user could potentially contact the system using any device such as a laptop, tablet computer, smartwatch et cetera.

In the embodiment described herein, the user will provide commands via voice. However, the commands could also be inputted by a text interface. It should be noted that the system can be configured to work with both text and audio signals. Working with text interfaces (and not only speech) can allow, for example, hearing impaired and mute people to also use the system.

Figure 2:
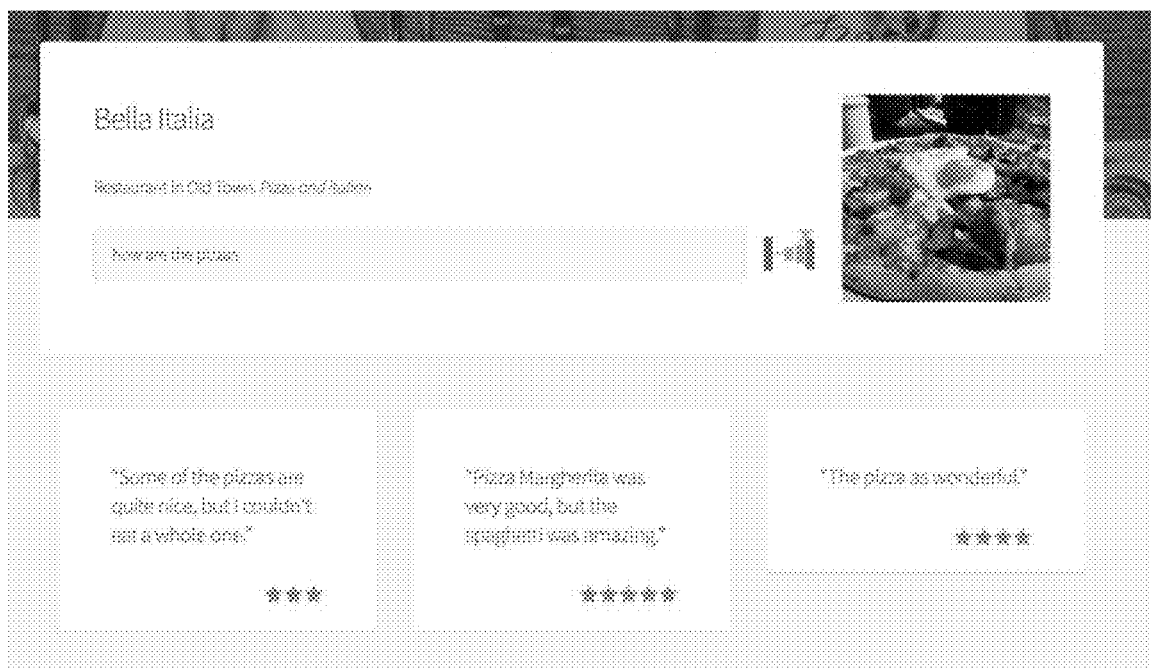
FIG. 2 is a screen shot of a display screen that can be output by a system in accordance with an embodiment.

The user inputs a query through the mobile telephone 551 and a response of the type shown in FIG. 2 is generated. For example, to generate the response of FIG. 2, the user while reviewing a specific Italian/pizza restaurant, inputted the phrase, "how are the pizzas?" The display is shown in FIG. 2 returns a picture of a pizza with previous customers' quotes concerning pizzas.

Figure 3:
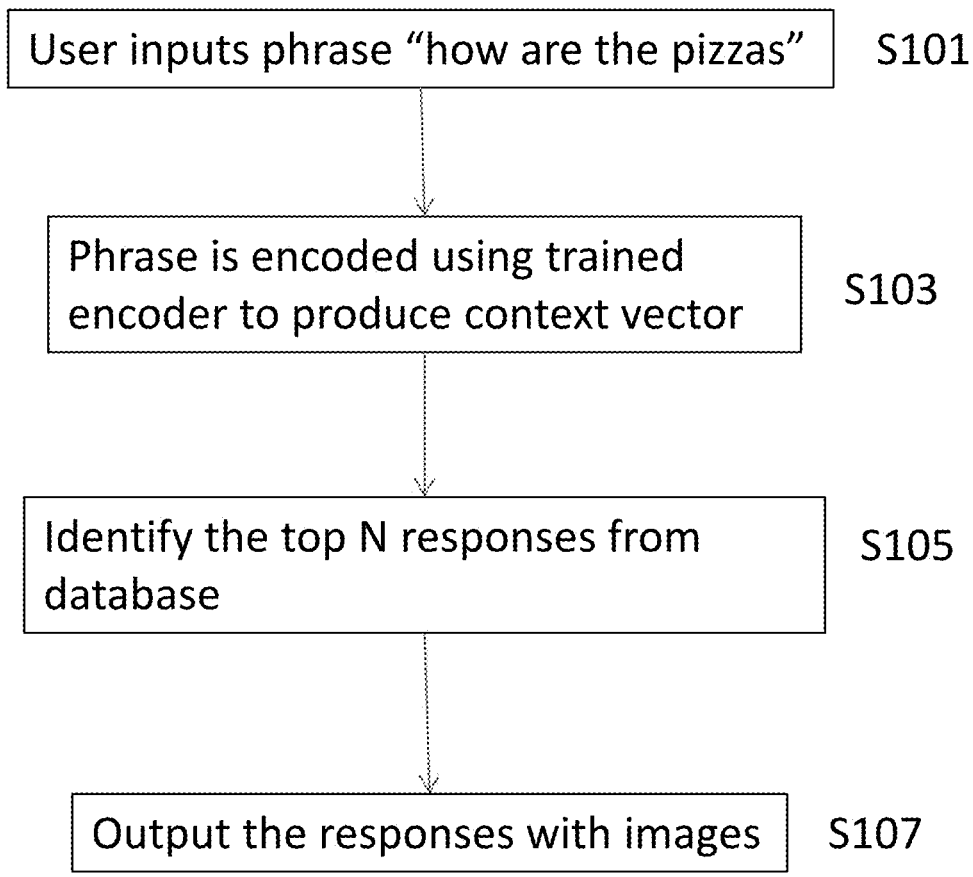
FIG. 3 is a flow chart showing a method in accordance with an embodiment.

FIG. 3 is a flowchart showing some of the key steps that are performed to generate the display shown in FIG. 2.

For the purposes of this example, it will be assumed that the user has already selected a restaurant and how this will happen will be described later.

In this example, in step S101, the user enters the phrase "how are the pizzas?" In step S103, the phrase is encoded using a trained encoder to produce a context vector. How the encoder will be trained will be described with reference to FIGS. 5 to 9.

In an embodiment, the user speaks to provide the phrase. The system comprises a speech processing module that converts the input speech to text. This text is then used in the next stage.

However, the encoder for a query is trained to output a vector (a context vector). The training has been performed using queries and corresponding responses. In an embodiment, these are selected from free text entries into social networking engines, restaurant review sites et cetera.

The model has been trained so that the encoder for a query produces a context vector which is very similar to a response vector for a suitable response. The similarity between the two vectors can be determined using a similarity measure such as the cosine similarity.

In one embodiment, the response vector does not only describe a phrase, but may also or additionally relate to a figure.

The possible response vectors have been generated off-line and reside in a database. Therefore, once the phrase is encoded using the trained encoder in the context vector is produced, the next stage is to look for similar vectors to this context vector in the response vector database.

In one embodiment, similarity is measured using cosine similarity. There are many possible ways in which the search space can be optimised to look for similar vectors.

Once the top in response vectors have been identified, these responses are output in a visual form as shown in FIG. 2. If images are also present, these may be output as well. For example, in one embodiment, a single image is output with maybe the 3 response vectors with the largest similarity scores.

In a further embodiment, the response is also output aurally and a speech synthesis module is used to output at least one or more of the responses as synthesised speech.

Returning now to FIG. 1, while it will be appreciated that the above embodiments are applicable to any computing system, an example computing system is illustrated in FIG. 1, which provides means capable of putting an embodiment, as described herein, into effect. As illustrated, the computing system 500 comprises a processor 501 coupled to a mass storage unit 503 and accessing a working memory 505. As illustrated, a dialogue manager 513 is represented as a software product stored in working memory 505. However, it will be appreciated that elements of the dialogue manager may, for convenience, be stored in the mass storage unit 503.

Usual procedures for the loading of software into memory and the storage of data in the mass storage unit 503 apply.

The processor 501 also accesses, via bus 509, an input/output interface 511 that is configured to receive data from and output data to an external system (e.g. an external network or a user input or output device). The input/output interface 511 may be a single component or may be divided into a separate input interface and a separate output interface.

Thus, execution of the dialogue manager 513 by the processor 501 will cause embodiments as described herein to be implemented.

The dialogue manager can be embedded in original equipment, or can be provided, as a whole or in part, after manufacture. For instance, the dialogue manager software 507 can be introduced, as a whole, as a computer program product, which may be in the form of a download, or can be introduced via a computer program storage medium, such as an optical disk. Alternatively, modifications to existing dialogue manager software can be made by an update, or plug-in, to provide features of the above described embodiment.

The computing system 500 may be an end-user system that receives inputs from a user (e.g. via a keyboard) and determines similarity values (e.g. for determining a response to a query). Alternatively, the system may be a server that receives input over a network and determines the similarity values. Either way, these similarity values may be used to determine appropriate responses to user queries, as discussed with regard to FIG. 3.

For instance, the mass storage unit may store the response vectors and associated responses.

FIG. 4(*a*) shows a flow chart of a more complex example than that shown in FIG. 3. The ranking model lends itself to the one-shot task of finding the most relevant responses in a given context. However, a restaurant-finding system needs to support a dialogue flow where the user finds a restaurant, and then asks questions about it.

In this embodiment, the dialogue state is represented as the set of restaurants that are considered relevant. This starts off as all the restaurants in the given city, and is assumed to monotonically decrease in size as the conversation progresses, until the user converges to a single restaurant. A restaurant is only considered valid in the context of a new user input, if it has relevant responses corresponding to it.

Explicitly, the flow works as follows:

In step S201, the system determines that the user is interested in restaurants in a specific location. This could be due to the system tracking the user's location, the user inputting this information in response to a prompt or due to the user inputting this info in the absence of a prompt.

A parameter S is initialised as the set of restaurants in the city

In step S203, the user inputs "a restaurant with a nice view of the castle".

As before, in step S205, the input phrase is encoded as described above.

In step S206, the encoded context vector produced in step S205 is put through an intent classifier that will be described below. If the intent classifier is negative then the process transfers to step S207.

In step S207, given the user's input, all the responses in the index pertaining to restaurants in S are retrieved and the top N responses, $r_1, r_2, \ldots, r_N$ are taken with corresponding cosine similarity scores: $s_1 \geq s_2 \geq \ldots \geq s_N$ Many methods can be used for determining a nearest neighbour search for determining the top N responses. In an embodiment, an approximate nearest neighbour search is performed where the responses are clustered and the similarity of the encoded context vector to the clusters is calculated.

Such a search can be considered to be a form of greedy routing in k-Nearest Neighbor (k-NN) graphs. In an embodiment an algorithm similar to Hierarchical Navigable Small World, HNSW (https://arxiv.org/abs/1603.09320) is used. In a specific embodiment, HNSW is used where the graph index is hierarchical and searched through greedily.

Using the above method based on HNSW provides better performance. In an example, an exact matching method took around 0.9 s per query. However using, the above approximate ranking, the time was only 0.007 s which retains 95% top-30 recall, that is, the speed-up is almost 130×.

Figure 4A:
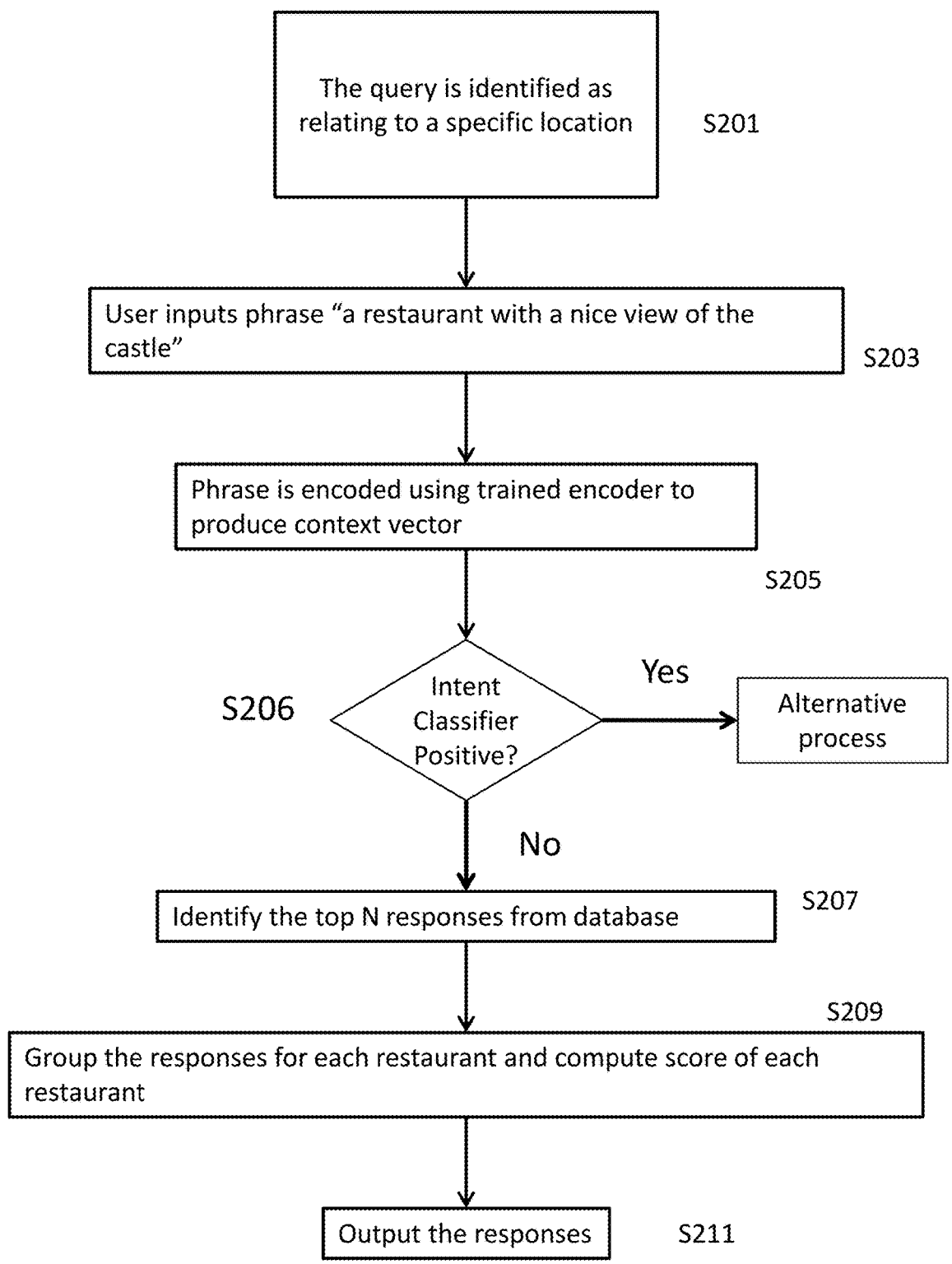
FIG. 4(a) is a flow chart showing a method in accordance with an embodiment.
Figure 4B:
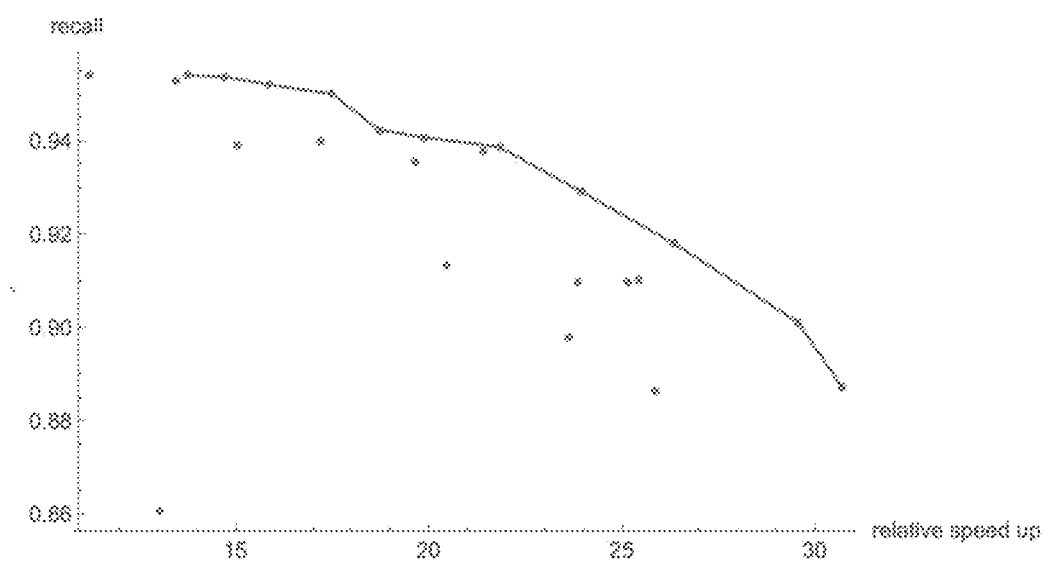
FIG. 4(b) is a graph showing the improvement in speed in finding nearest neighbours using a method in accordance with an embodiment.

FIG. 4(b) shows the speed-ups achieved over a system that uses caching of the top-30 recall measure: They axis shows the recall time of the cached method and the x-axis shows the increase in speed using the approximate method. A system that uses caching has higher memory and storage requests is less suitable for use with a processor in a mobile telephone. The caching baseline requires approximately 0.09 s per each query, which means that the approximate method is 13× quicker.

In this example, there are multiple restaurants and the restaurants also need to be ranked. In an embodiment, this is performed by first computing probability scores $p_i \rightarrow \exp(a\ s_i)$ with:

$$\sum_{i=1}^{N} p_i = 1$$

for a >0 constant hyper-parameter

In step S209, the responses for each restaurant are grouped and a score $q_e$ for each restaurant $e \in S$ is determined $$q_e = \sum_{i: r_i \in e} p_i$$

Update S to the smallest set of restaurants with highest q whose q values sum up to more than a threshold t Next, in step S211 the most relevant responses for S are collated and the top 2 are selected. If there are multiple relevant restaurants, one response is shown from each. When only one restaurant is relevant, the top N responses are all shown, and relevant photos are also displayed.

A simple set of rules is used to provide a spoken response for the system (e.g. "One review of X said '_'"). The rules employ templates to allow a natural answer to be provided. For example, if the user inputs a query that is likely to return responses relating to multiple restaurants, for example "Where is good for Indian food?"—a response will be provided with templates such as "Check out these places.", "I found . . . ". However, when the responses relate to just one restaurant, the system might respond "According to . . . ", "Check out these results . . . ."

As noted above, the number of restaurants is reduced as the dialogue progresses. When the user asks a first question, N top responses are identified and these correspond to S restaurants. When the user asks a follow-up question, the context vector of the new query is generated and this is compared with the response vectors for the already identified S restaurants.

Once a new set of responses has been identified—only the restaurants (which are selected from the former group of restaurants) with the q value that sums to more than the threshold will be retained ad so the number of restaurants is continually reduced until there is just one restaurant.

As noted above, in step S206, the encoded context vector is put through an intent classifier. One or more classifiers may be used. In an example, the system uses a set of intent classifiers, to allow resetting the dialogue state, and activating the table reservation flow.

Possible results from examples are shown below:
finding and booking a restaurant with a nice view of the castle (FIG. 10)
what cafe did JK Rowling write Harry Potter in (FIG. 11)
adding owner-submitted responses (FIG. 12)

In an embodiment, there are two dedicated classifiers applied in step S206 for discrete intent classification. For example, there are binary classifiers (i.e., the output of the classifier is 1 (intent detected) or 0 (no intent detected)) for two discrete intents:
1) restarting the conversation (i.e., restarting the search space and starting from scratch); and
2) transferring to the slot-based booking flow.

The two classifiers make use of the already-computed $h_c$ vectors that represents the user's latest text, and the actual classifier architecture can be, for example, a one-layer neural classifier with ReLu non-linear activation function and a 100-dimensional hidden layer.

In this example, a sigmoid function is used at the output layer and the training objective used is a (binary) cross-entropy loss function. The classifiers have to be trained on a set of positive and negative examples: the set of 100 positive examples for both intents (1. restart, 2. transition to booking) has been manually created (e.g., for the restart classifier positive examples are "Let's start again", "Restart", "Start over", "Let's do it again"), while a set of N (N=500 in an example) negative examples has been randomly sampled from the large pool of available responses. For transition to booking, the intent classifier can be trained on positive examples such as "I would like to book a table", "Do they have a table free?" etc.

If the intent classifier in step S206 is positive then an alternative process is used such as a slot based booking system or if the restart classifier is positive, then the system starts at the beginning and does not presume that a restaurant etc has been already selected.

Figure 4C:
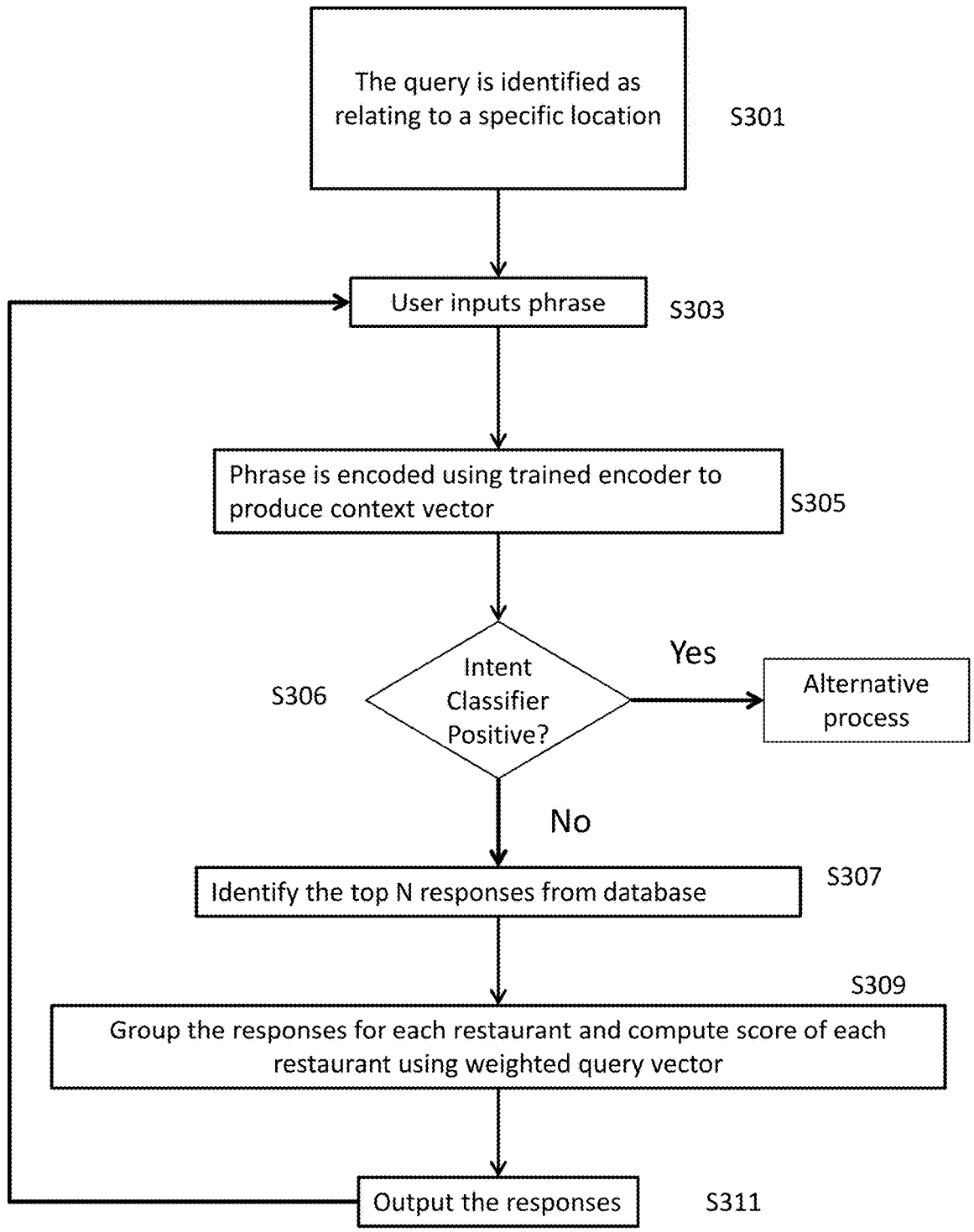
FIG. 4(c) is a flow chart showing a method in accordance with an embodiment where the user changes their preferences.

A variation on the flow chart of FIG. 4(a) is shown as FIG. 4(c). In the flow chart of FIG. 4(a), the dialogue flow does not allow for:
1) fallback responses (i.e., the system does not report if there are 0 matched entities or if the similarity is too low). This is possible by defining an additional threshold for scores $q_e$ (if the score is below the threshold, it can be assumed that there are no relevant responses and the system issues the "sorry can't help" act);
2) changing goal: in the dialogue flow of FIG. 4(a), the set S (restaurants) is always decreasing in each turn/question. However, the flow chart of FIG. 4(c) allows a user to change goals/intents, i.e., if the users change their mind and want Chinese food instead of Indian food, it is possible (in the flow chart of FIG. 4(c)) to expand the set S (i.e., to revert it to a previous state from one of the previous turns).

In FIG. 4(c), in step S301, as in FIG. 4(a), the system determines that the user is interested in restaurants in a specific location. This could be due to the system tracking the user's location, the user inputting this information in response to a prompt or due to the user inputting this info in the absence of a prompt.

A parameter S is initialised as the set of restaurants in the city

In step S303, the user inputs a query, for example "is there a good Chinese restaurant?"

As before, in step S305, the input phrase is encoded as described above.

In step S306, the encoded context vector produced in step S305 is put through an intent classifier that will be described below. If the intent classifier is negative then the process transfers to step S307.

In step S307, given the user's input, all the responses in the index pertaining to restaurants in S are retrieved and the top N responses, $r_1, r_2, \ldots, r_N$ are taken with corresponding cosine similarity scores: $s_1 \geq s_2 \geq \ldots \geq s_N$ Many methods can be used for determining a nearest neighbour search for determining the top N responses as discussed above in relation to FIG. 4(a).

In this example, there are multiple restaurants and the restaurants also need to be ranked. In an embodiment, this is performed by first computing probability scores $p_i \propto \exp(a \, s_i)$ with:

$$\sum_{i=1}^{N} p_i = 1$$

for a >0 constant hyper-parameter

In step S309, the responses for each restaurant are grouped and a score $q_e$ for each restaurant $e \in S$ is determined. However, in step S309, a weighted query vector is used.

$$q_e = \sum_{i:r_i \in e} p_i$$

As noted above, in this embodiment, the method allows the user to modify their searching goals. For a single query the query vector is the same for both flow chart 4(a) and 4(c). However, if the query is a subsequent query from the user, then instead of maintaining the matching restaurant set as the dialogue state, the method now records the user query (text) across different turns. The user query at each turn is encoded as a query vector, and these query vectors across turns are then weighted and summed (with a decay factor) to form a weighted query vector q'. Decay factor d is a parameter controlling the importance of the previous turns (d=0 means no context is used).

Figure 4D:
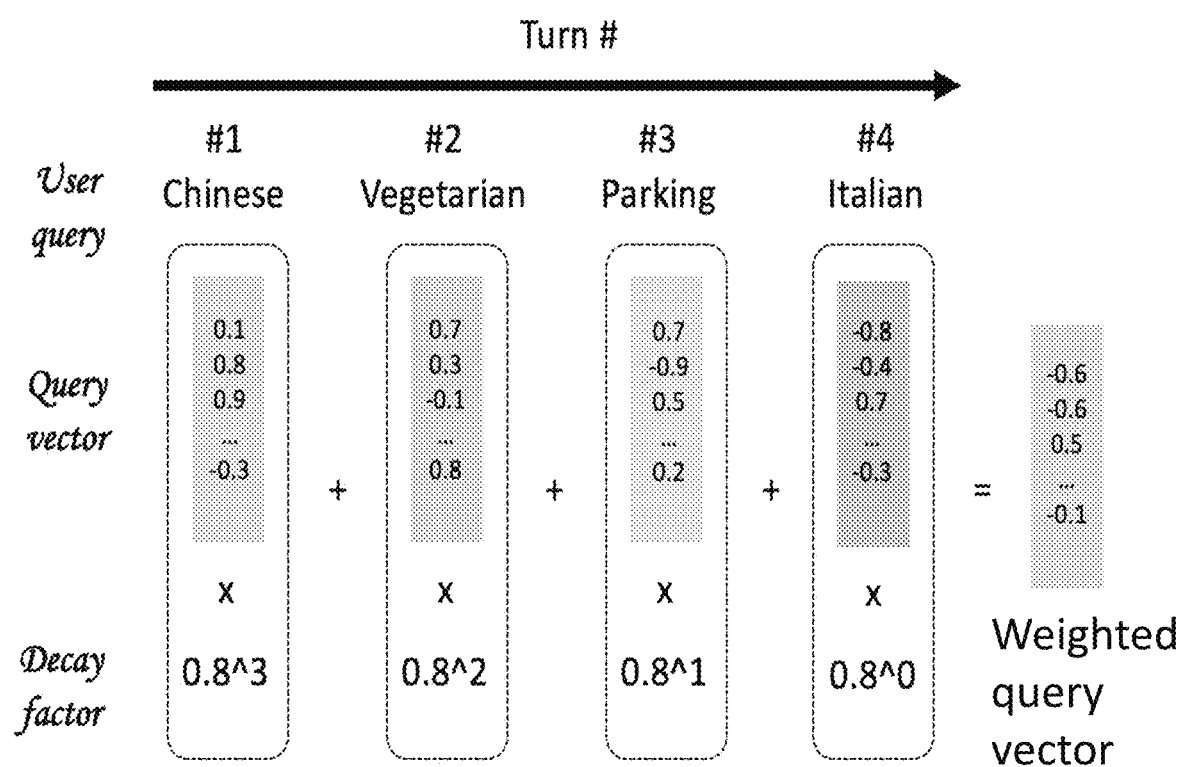
FIG. 4(d) is a diagram illustrating how a query vector is weighted.

FIG. 4(d) is a schematic showing 4 "turns" or queries where first the user asks "Is there a Chinese restaurant?" The query vector is just the embedded vector for the single query. However, if the user then asks a follow-up query. —"Do any of these restaurants have vegetarian options?". A single query vector will be produced here, but it will be a combination of the first and second query vectors. In an embodiment, this is realised by adding the vectors produced from both queries and weighting the latest question more heavily than the first question.

In FIG. 4(d), there are two further questions "I am looking for a restaurant with parking" and question 4—"I am looking for somewhere with Italian food". As shown in FIG. 4(d), a query vector for each of these queries in produced and then a weighted sum of these vectors is produced. In this embodiment, the weighting is $0.8^N$ where N represents how many questions have been asked since the question was first asked. However, other measures of weighting the questions could be achieved.

Using the method of FIG. 4(c), questions that request more detail following the user's first question can be handled. These questions can also be handled using the method of FIG. 4(a). However, the fourth question of FIG. 4(d) could not be handled by the method of FIG. 4(a) as the search in FIG. 4(a) would be restricted to the field of the first question whereas this is not true for FIG. 4(d). Also, preferences such as "vegetarian options" and "parking" would also affect the answer provided by the system even when the user changed their preference from Chinese to Italian food.

In FIG. 4(c) S is updated to the smallest set of restaurants with highest q whose q values sum up to more than a threshold t.

Next, in step S211 the most relevant responses for S are collated and the top 2 are selected. If there are multiple relevant restaurants, one response is shown from each. When only one restaurant is relevant, the top N responses are all shown, and relevant photos are also displayed.

Figure 5:
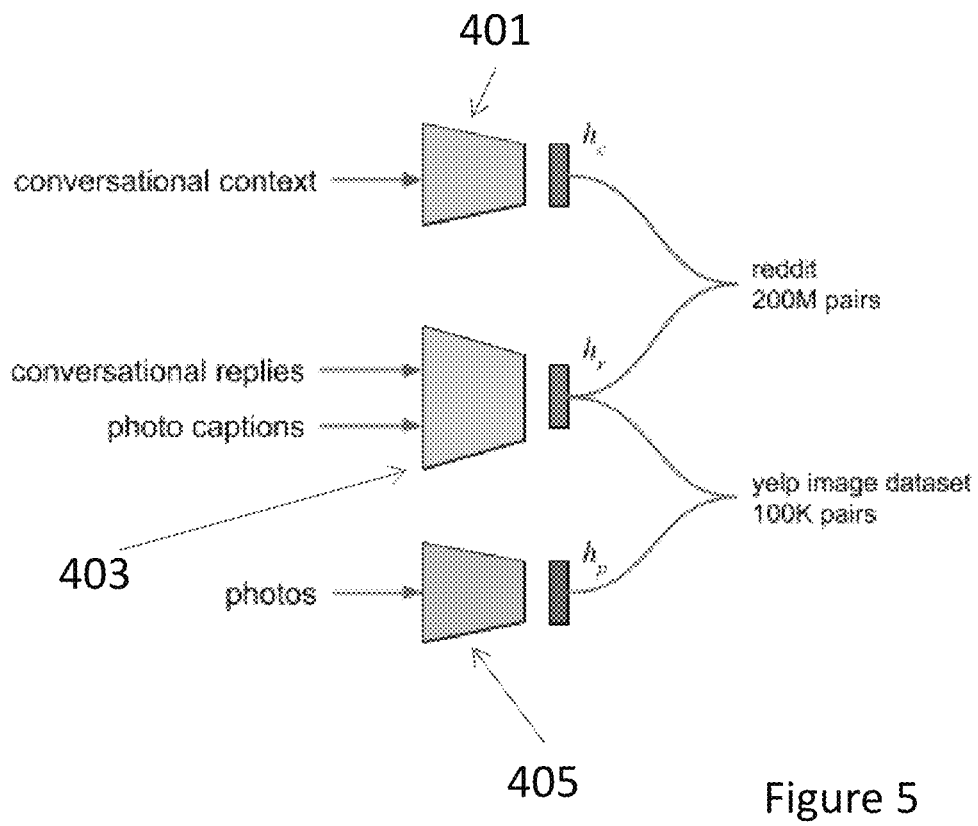
FIG. 5 is a diagram showing how the system is trained.

FIG. 5 is a schematic of the architecture of the model. The model is a ranking model, encoding contexts, replies, and photos to vectors $h_c$, $h_r$ and $h_p$.

In an embodiment, there are three main parts to the architecture:
1. Context mapping section 401 that comprises a neural net that maps a query to a context vector $h_c$;
2. Conversational response section 403 maps a response or photo caption to a response vector $h_r$. Conversational response section 403 also comprises a neural net; and
3. Photo mapping section 405 that maps a photo to a photo response vector $h_p$.

The visual response system is powered by a single large model, that is trained on a large amount of conversation and image data. It is a ranking model that learns to score conversational replies and images in a given conversational context. Typical training datasets for modular task-based dialogue systems are quite small and contain several thousands of annotated dialogues. However, the above embodiment can use large datasets, for example a large Reddit dataset (e.g., more than 200M comment-response pairs from Reddit), and other datasets are also much larger than standard dialogue datasets.

Figure 8:
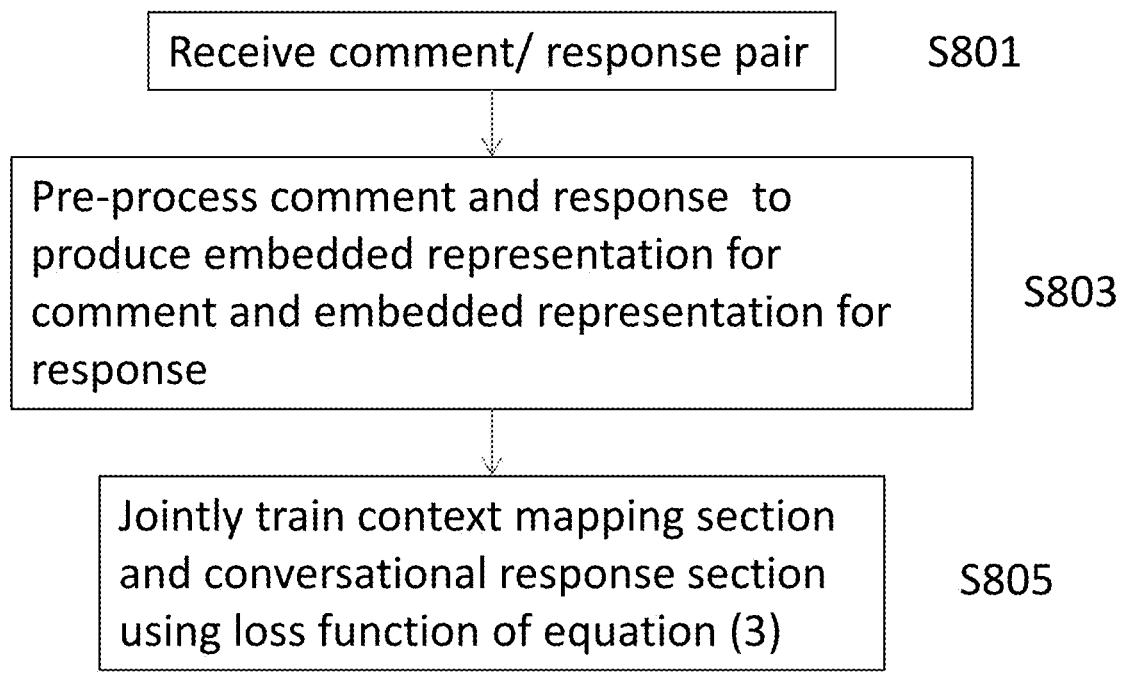
FIG. 8 is a flowchart showing the training method in accordance with an embodiment.

FIG. 8 is a flow diagram showing the training of a system. In step S801 comment response pairs are received. In an embodiment, these are from a social media platform such as Reddit. However, any source of paired comments and responses could be used. Multiple sources could also be used. For example, a social media platform could be used in combination with a source of comments and responses supplied from an authorised source. For example, in the case of a looking for a restaurant, the comments and response could be supplied from reviews of the restaurant from social media and questions with answers supplied from the owner of the restaurant.

For example, all of Reddit is available as a public Big-Query dataset. In an embodiment, the 2016 and 2017 data was used. It was filtered to extract short comments, and extract pairs of comments and their responses. This gives around 200 million pairs. Ranking responses on Reddit was introduced by Al-Rfou et al. 2016., Conversational Contextual Cues: The Case of Personalization and History for Response Ranking, https://arxiv.org/pdf/1606.00372.pdf.

Figure 7:
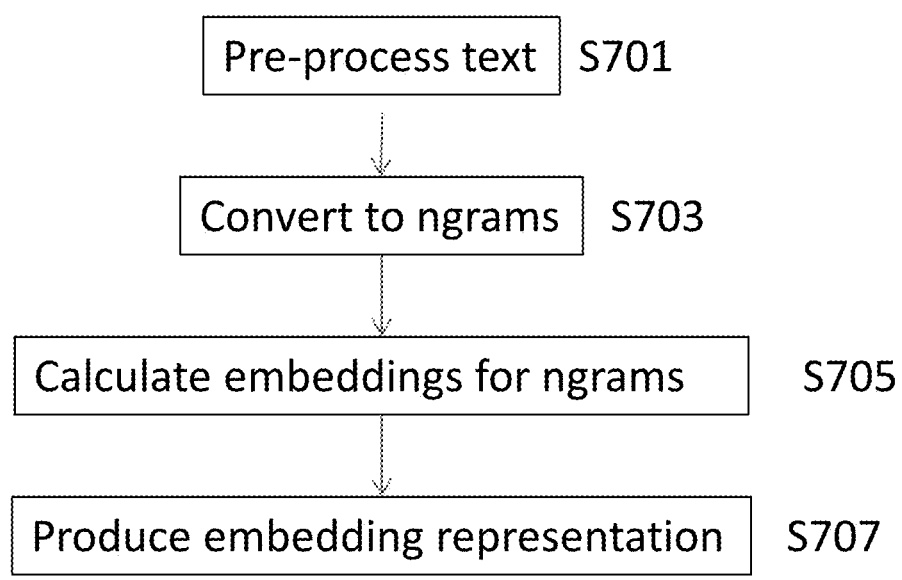
FIG. 7 is a flowchart showing a method in accordance with an embodiment showing how an embedded representation is produced.

The comment-response pairs are then pre-processed in step S803 to produce an embedded representation for a response and an embedded representation for a comment How this is achieved will be described with reference to FIG. 7.

In step S805, a context mapping network (see FIG. 5) and a conversational reply mapping network (see FIG. 5) will be trained. Each of these have the structure described with reference to FIG. 6. An embedded representation for a response is used as the input to the conversational reply section and an embedded representation for a comment is used at the input for the conversational context section. The output of the conversational context network is a context vector $h_c$, the output of the conversational reply network is a response vector $h_r$.

The two networks are jointly trained by considering the similarity between $h_c$, and $h_r$ in step S803 as described below.

S(r, c)—the score of a candidate reply r given a conversational context c, and

S(p, c), the score of a candidate photo p given a conversational context c.

Both of these scores are computed as a scaled cosine similarity of a vector that represents the context, and a vector that represents the candidate:

$$S(r, c) = C \frac{h_r \cdot h_c}{|h_r||h_c|} = C \bar{h}_r \bar{h}_c \quad (1)$$

where C is a learned constant, and $\bar{h}$ is h normalized to a unit vector, similarly the score for a photo is:

$$S(p, c) = C \frac{h_p \cdot h_c}{|h_p||h_c|} = C \bar{h}_p \bar{h}_c \quad (2)$$

Using a scaled cosine-similarity ensures that the scores are calibrated across training runs, which makes thresholding the scores easier.

During training, C is constrained to lie between 0 and $\sqrt{\text{dimh}}$ using an appropriate activation function. It is initialized to be between 0.5 and 1, and invariably converges to $\sqrt{\text{dimh}}$ by the end of training. Empirically, this helps with learning.

The reason to combine the cosine similarity with the learned scaling constant C is twofold:

1) without the scaling factor C, all similarity scores are crammed into the [−1; 1] interval which intuitively reduces the expressiveness of the model;

2) using the unconstrained dot product instead of cosine mitigates this problem, but introduces another problem: the dot products grow large in magnitude, pushing the softmax function into regions where it has extremely small gradients. Therefore, in order to control map the scores into a larger interval, but still to control the magnitude, the scaling factor C is introduced.

Empirically, the inventors have verified that the model that uses cosine with the scaling factor C outperforms variants which: 1) use dot-product only, or 2) use the cosine similarity without the scaling constant C.

In an embodiment, scoring functions are learned using the loss function:

$$\sum_{i=1}^{N} S(r_i, c_i) - \sum_{i=1}^{N} \log \sum_{j=1}^{N} \exp(S(r_j, c_i)) \quad (3)$$

Where $(r_i, c_i)$ are pairs of responses and contexts that go together in training, and N is the batch size.

The matrix $S_{ij} = S(r_j, c_j) = C[\hat{h}_{r,1}, \hat{h}_{r,2}, \ldots, \hat{h}_{r,N}] \cdot [\hat{h}_{c,1}, \hat{h}_{c,2}, \ldots, \hat{h}_{c,N}]^T$ is inexpensive to compute, so this leads to an efficient loss function that maximises the score of pairs that go together in training, while minimising the score of random pairings.

In the embodiment, a system is provided that;

1) provides a task-based dialogue system for searching scenarios based on response retrieval;

2) introduces a multi-modal component to the system linking textual queries to both visual and textual responses in the shared semantic space;

3) the Reddit dataset is only one part of our training data;

4) the system also outperforms the system from Al Rfou et al. (see the below table) despite being trained for a shorter period of time, that is, our system is both more effective and more efficient than their preliminary response retrieval system tied to their Reddit dataset.

The model hyper-parameters are specified in the code. Training is conducted for 24 hours, using several workers. This typically results in the model seeing around 5.5 million batches of 50 examples each.

The model is evaluated using 1-of-100 accuracy, i.e. how often the model scores the correct response highest for a given context, among 99 other randomly selected candidates. Below are some results, showing how we have improved the accuracy over time.

TABLE 1

Main results.

| | |
|---|---|
| Most comparable model from Al Rfon et al. (2016) | 48% |
| Using unigrams only | 35% |
| Add bigrams | 48% |
| Add orthogonal initialisation | 51% |
| Add layer normalisation* and residual connections** | 52% |
| Add self-attention*** in embedding layers | 54% |
| Use a wider encoder network (doubling the dimensionality of unigram and bigram representations) | 55% |

The scores are 1-of-100 accuracy, i.e., how often the model scores the correct response highest for a given context, among 99 other randomly selected candidates.

In an embodiment, residual connections are added as a technical improvement to the basic methodology. Also, self-attention, sometimes called intra-attention is an attention mechanism relating different positions of a single sequence in order to compute a representation of the sequence. Self-attention has been used successfully in a variety of tasks including reading comprehension, abstractive summarization, textual entailment and learning task-independent sentence representations.

At inference time, finding relevant candidates given a context reduces to computing $h_c$ for the context c, and finding nearby $h_r$ vectors. The $h_r$ vectors can all be pre-computed, and the nearest neighbour search can be optimized, giving an efficient search that can scale to billions of candidates.

The fact that $h_r$ vectors can all be pre-computed enables the use of external optimisation libraries (as this one for example: https://github.com/facebookresearch/faiss) for nearest neighbours search that enable efficient search of a large pool of candidate responses. The optimisation of nearest neighbour search is a well-known problem in computer science and the above embodiment enables a direct implementation of readily available solutions The text features, the context c (the single latest sentence in a conversation) and r (a candidate response in a conversation), are represented using unigram and bigram embeddings, followed by a few hidden layers.

The tensorflow graph takes these text features as raw strings, and encodes all text preprocessing, tokenization, n-gram extraction and vocabulary look-up in the tensorflow graph itself. This allows for a simple API for using the model, where the user only needs to provide raw text.

The exact setup in accordance with an embodiment is discussed below and explained with reference to FIG. 7:

In step S701, the text be it from a response, query or photo-caption is pre-processed. In this embodiment, pre-processing comprises, putting the raw text of one of: the response; query; or photo-caption through a series of regular expressions that:

lower-cases the text, replaces URLs with a special token tokenizes based on punctuation, keeping 't and 's as tokens Keeping 't and 's is a useful heuristic way to retain information. 't indicates that a negation likely took place (as "haven't", "won't", "don't" get tokenised to "haven_, _'t", "won_, _'t", and "don_ _'t" respectively). Similarly, 's is a strong indicator that a possessive has been uttered, as in Simon's or restaurant's, or a shorter variant of an auxiliary verb in examples such as It's great or It's been fantastic. Thus, keeping 't and 's is a preprocessing design choice which helps the encoding training to capture the information that would otherwise get lost with another tokenisation choice.

replaces long words and long numbers with special tokens

Replacing long words and long numbers with two special wildcard tokens (LONGWORD and LONGNUM, respectively) is done to trim the already large vocabulary (and consequently reduce the data sparsity) as long words are typically less frequent in the corpus (and will therefore have unreliable parameter estimates with a statistical model). Long numbers (with more than 5 digits) are not essential content-wise for the restaurant searching task, and a large number of possibilities increases the vocabulary size without any benefit for the final performance.

adds beginning and end of sentence tokens.

The text is then converted to unigrams, bigrams in step S703. In some embodiments, trigrams and higher order n-grams can be used. In an embodiment, the n-grams are outputted to a sparse tensor in Tensorflow. The sparse tensor is represented as three tensors defining indices, values and shape where: indices defines the indices in the sparse tensor that represent non-zero values; values supplies the values for each element in indices; and shape defines the shape of the sparse tensor The use of sparse tensors improves computational speed and memory storage. The above method is likely to produce tensors with many zero entries, these are more efficiently handled using sparse tensor where computation can be performed only by iterating through the non-zero elements.

In the above embodiments, the initial coding of each entry sentence will have many zero entries: as there will be a large vocabulary of 750,000 unigrams and 750,000 bigrams, only a small number of unigrams and bigrams will be present in the sentence at hand. Therefore, storing the one-hot encoding of the input sentence in a sparse tensor is much more convenient than storing a large tensor with 1.5M zero entries. This data structure also saves some memory and is therefore particularly suitable for the constraints of processing within a mobile telephone.

In this embodiment, the unigrams and bigrams are in separate tensors. However, it is also possible to have unigrams and bigrams combined in the same tensor.

Embeddings for each unigram and bigram are computed in step S705. In an embodiment, Unigrams and Bigrams have separate embedding matrices, each of shape [750 000, 160]. The embedding matrices contain vector/embedding representations of unigrams and bigrams: these are the model parameters shared and updated during training. When seeing a new sentence that has to be encoded, the model will rely on these parameters (estimated during training) to infer a vector encoding of the input sentence: i.e., there is a difference between training and test/inference time. These global embedding matrices (unigrams and bigrams are separated into two matrices) are estimated using training data, and then leveraged at inference time to encode new sentences (using the procedure already described in the specification).

In an embodiment, trigram and higher order n-grams can be used and these would be treated the same as explained above for unigrams and bigrams.

In an embodiment, the process of building representations for unigrams considers words not seen in the training data as out-of-vocabulary and are therefore replaced by a wildcard token <UNK> which is assigned a single vector randomly sampled from the unigram embedding matrix.

In a further embodiment, a hash embedding may be used. A hash embedding may be seen as an interpolation between a standard word embedding and a word embedding created using a random hash function. In hash embeddings each token is represented by k d-dimensional embeddings vectors and one k-dimensional weight vector. The final d-dimensional representation of the token is the product of the two. Rather than fitting the embedding vectors for each token these are selected by the hashing trick from a shared pool of embedding vectors.

In step S707, the unigram and bigram embeddings are each summed and divided by the square root of the number of tokens. The two vectors are then averaged to give a single 320-dimensional representation of the text. This embedding representation is then used as the input layer 601. It should be noted that in this embodiment, the number of tokens refers to the sentence length in terms of its a) unigram length, and b) bigram length. In other words, the "number of tokens" when computing the unigram representation of the input sentence refers to the total number of unigrams in the sentence, while it refers to the total number of bigrams when computing the bigram representation of the same sentence. The two vectors (unigram and bigram) are then averaged to give a single 320-dim representation of the input sentence/text.

The pre-processing explained above with reference to FIG. 7 is used for: the conversational context; the conversational replies; and the photo captions during both inference and training.

Figure 6:
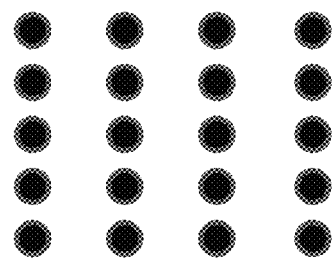
FIG. 6 is a simple schematic of the layers of the system.

The embedding representation is passed through three hidden layers of size 512 as shown in FIG. 6. The first two 603 and 605 use a tan h non-linearity, and the last 607 uses no non-linearity The final hidden layer 607 is then used as the vector encoding of the text, $h_c$ or $h_r$. This provides a fast encoding of the text, with some sequence information. Experiments to try recurrent or convolutional structures have not provided any accuracy gain, and slow the model down considerably. The embeddings constitute the majority of the final model's parameters, which is around 1 GB in size.

Returning to FIG. 5, context mapping section 401 comprises the layer structure shown in FIG. 6 and conversational response section 403 also comprises the layer structure of FIG. 6. Although the layer structures in sections 401 and 403 are the same, different weightings are applied to the layers. However the weightings are determined from joint training as explained above.

As explained above, photos can also be used as part of the response. In an embodiment, photos are represented using CNN models pre-trained on ImageNet.

In one embodiment, a Mobilenet model is used with a depth multiplier of 1.4, and an input dimension of 224 by 224 pixels. The pre-trained model is downloaded from Tensorflow Slim. This provides a 1280×1.4=1792-dimensional representation of a photo, that is then passed through a single hidden layer of dimensionality 1024 with ReLu activation, before being passed to a hidden layer of dimensionality 512 with no activation to provide the representation $h_p$.

In an embodiment, training is done in two stages: the first stage trains the text representations $h_c$ and $h_r$ on the Reddit dataset; in the second stage, these are then frozen, and the hidden layers on top of the Mobilenet CNN are trained using the yelp dataset.

Figure 9:
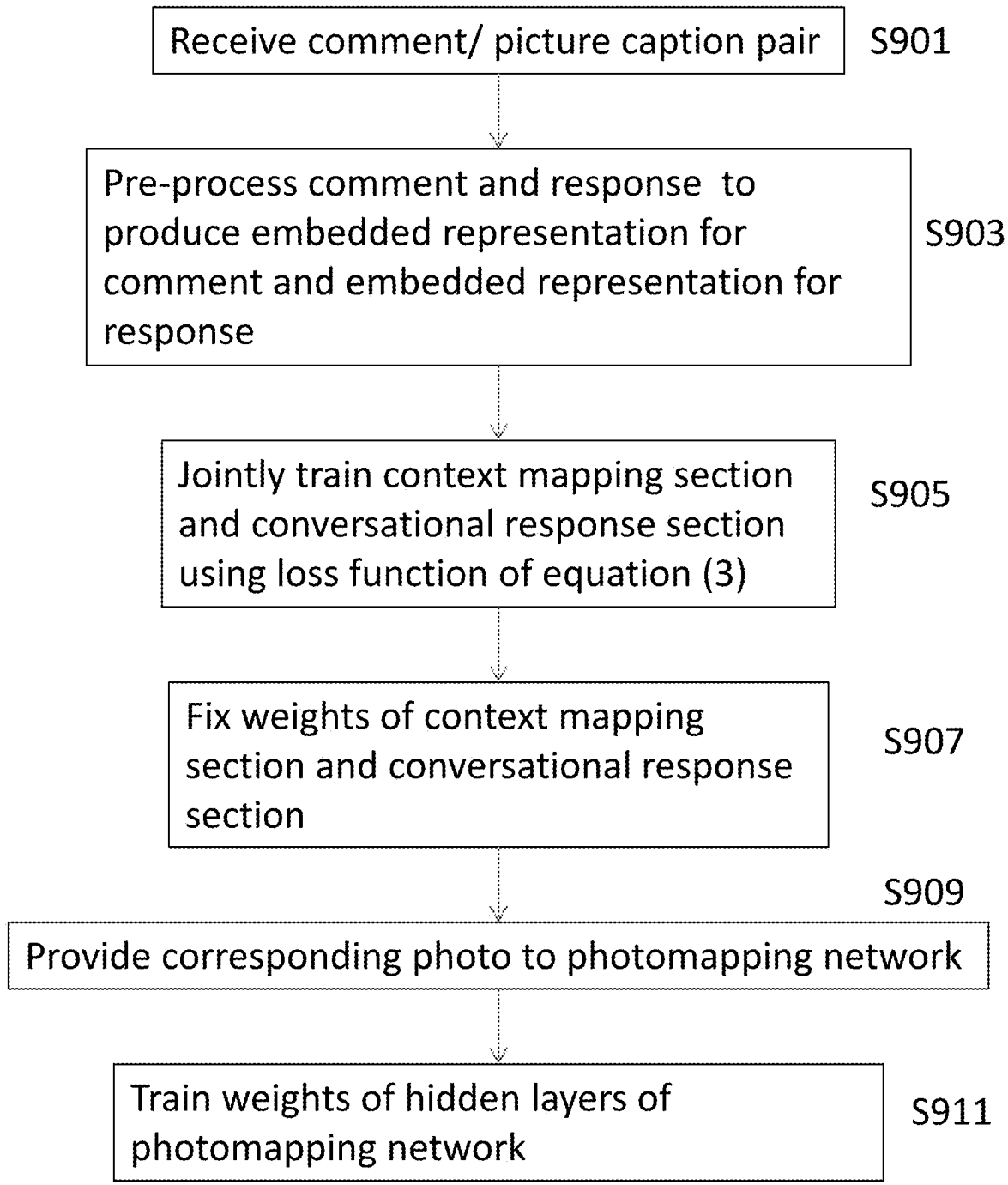
FIG. 9 is a flowchart showing a training method in accordance with an embodiment for photo response.

This is shown in detail in FIG. 9. In step S901, comment—picture caption pairs are received. As before these are from a social media platform such as Reddit. However, any source of paired comments and responses could be used. Multiple sources could also be used. For example, a social media platform could be used in combination with a source of comments and responses supplied from an authorised source. For example, in the case of a looking for a restaurant, the comments and response could be supplied from reviews of the restaurant from social media and questions with answers supplied from the owner of the restaurant.

The comment-figure caption pairs are then pre-processed in step S903 to produce an embedded representation for a figure caption and an embedded representation for a comment How this is achieved will be described with reference to FIG. 7.

In step S905, a context mapping network (see FIG. 5) and a conversational reply mapping network (see FIG. 5) will be trained. Here, the embedded representation for a figure caption is used as the input to the conversational reply network. Each of these have the structure described with reference to FIG. 6. The output of the conversational context network is a context vector $h_c$, the output of the conversational reply network is a response vector $h_r$.

The two networks are jointly trained by considering the similarity between $h_c$ and $h_r$ in step S905 as described above.

In step S907, the weights of the context mapping section and conversational response section are fixed. Next, a photomapping network is trained. The photomapping network comprises a plurality of hidden layers on top of a pre-trained CNN, using data taken from the yelp dataset. In an embodiment, the pre-trained CNN comprises depthwise separable layers, for example using the mobilenet architecture https://arxiv.org/pdf/1801.04381.pdf.

In an embodiment, a dataset of around 100K photos and their captions are provided in step S909. The mobilenet CNN features are then pre-computed for the dataset using another (which takes around 30 minutes). Training maximizes the similarity of captions encoded with the response encoder $h_r$ to the image representation $h_p$ in step S911. This training takes around 10 minutes, and results in a 1-of-100 accuracy of predicting the correct caption given the image of around 24%.

As a result, it is possible to compute the score of a photo given a context using the cosine similarity of the respective vectors. The training procedure means a photo will be scored highly if it looks like its caption would be a good response. If a caption is available for the photo, then the response vector representation of the caption is averaged with the photo vector representation to compute the score.

If a caption is not available at inference time, only the photo vector representation will be used.

In summary the following process is performed:
1. Jointly train two encoding functions (with shared word embeddings) f(conversational context) and g(response), so that similarity(f, g) is high for Reddit comment pairs (200M or so short comment pairs) and low for random pairs.
2. Freeze function g( ), and learn a function h(image) that makes similarity(g(caption), h(image)) high on 200K yelp restaurant images, and low for random pairs. h is a CNN pre-trained on ImageNet, with a shallow DNN on top.

Then given a query, learn its representation by encoding it to f(query), and find nearby images and responses according to g and h respectively. These should be responses that look like answers to the query, and images that look like they would have captions that would be answers.

In a further embodiment, further training steps are added after the weights of the conversational response network and photomapping network are trained. Specifically, the embedded response and photo vectors are clustered using a technique such as k-means or the like. A vector then representing each cluster is determined. During operation, the nearest neighbour search uses the vectors representing each cluster to extract the N nearest neighbours.

As a test, the yelp dataset is used at inference time to provide text and photo candidates to show the user at each step in the conversation. The responses were limited to a given city. For Edinburgh the following results were achieved;
  396 restaurants
  4 225 photos, some with captions. These include extra photos obtained using the google places API
  6 725 responses created from the structured information about restaurants that yelp provides, converted using simple templates to sentences of the form "Chez Jules accepts credit cards."
  125 830 sentences extracted from reviews These responses can be augmented with any text or photos that can be attributed to a restaurant, e.g. owner-specified information. In this case, responses may have an anticipated context, maybe a question they would like the answer to be triggered on.

A candidate in the index is represented using a vector that is the average of:
1. the vector representation of the text, if it has text (a caption in the case of photos) $h_r$
2. the vector representation of the photo, if it has a photo $h_p$ (these are precomputed and stored in the index file)

3. the vector representation of the anticipated context for owner-specified responses $h_c$ For example, in one embodiment, the model is retrained using additional question-response pairs provided by the owner. An alternative solution is to use the generated question-response pairs only at runtime using the following adaptation of the main model without retraining. When the owner of a restaurant adds a question-answer pair, the question is encoded using the model and this is stored as pre-computed information (the entity for which the pair was generated, and the answer to this particular question is also stored, and the highest similarity score possible is assigned to that answer).

In an embodiment, if the user asks questions about this particular restaurant, first it is checked if the question has a high similarity with any of the manually generated questions for which there are pre-computed vectors. If the similarity is above a certain (manually defined) threshold, full response retrieval is not performed, but the answer defined by the restaurant owner is generated. If the similarity is below the threshold, the full response ranking process is performed over the response space. This way, a manually generated response for the user's question "what is today's daily special" (see FIG. 12(g)) can be generated even when the actual manually defined question is "what is today's special?" (See FIG. 12(f)).

The score of the candidate is then the cosine similarity of the dialogue context vector with this average vector. Note that using cosine similarity rather than dot-products makes this averaging more meaningful. In an embodiment, for owner-specified responses the similarity can be set to a high value for a particular set of questions manually (i.e., "pre-compute" their similarity with a specific set of questions).

In an embodiment, the restaurant browsing and booking system supports the discrete actions of restarting the conversation, and transferring to the slot-based booking flow. This is achieved using two binary intent classifiers, that are run at each step in the dialogue.

In an embodiment, these intent classifiers make use of the already-computed $h_c$ vector that represents the user's latest text.

A single-layer neural network is learned on top of the 512-dimensional encoding, with a ReLu activation and 100 hidden nodes. In an embodiment, there are two dedicated binary classifiers which are fed by the 512-dimensional encodings, that is, they are learned on top of the output originating from layer 607. I have described the training details (i.e., training examples and the objective function) earlier in this clarification document Using the Reddit encoding has shown better generalisation on initial experiments when compared to models learned from scratch, and the models can be learned in seconds.

For completeness, it is noted that the responses that are used in the training of the system (from the query/response pairs) might not be provided as the responses that can be retrieved during run time. Once the model has been trained, new responses that are more relevant to the area of use of the system (for example, restaurant review websites, etc) can be used either in addition to or instead of the responses used during training.

The responses that may be retrieved during inference are embedded prior to inference being performed. These responses are embedded using the neural network trained during the training process. In an embodiment, the method of FIG. 7 is used for embedding.

Embedding of responses can be done in parallel since the embedding of each response is independent of the other responses. Thus, this can be performed efficiently using a multi-core processor or GPU.

Also, during inference, in an embodiment, the query is embedded using the method described with reference to FIG. 7.

FIGS. 10 to 12 show examples of dialogue flow that can be achieved with the system and the method of the embodiments.

Figure 10A:
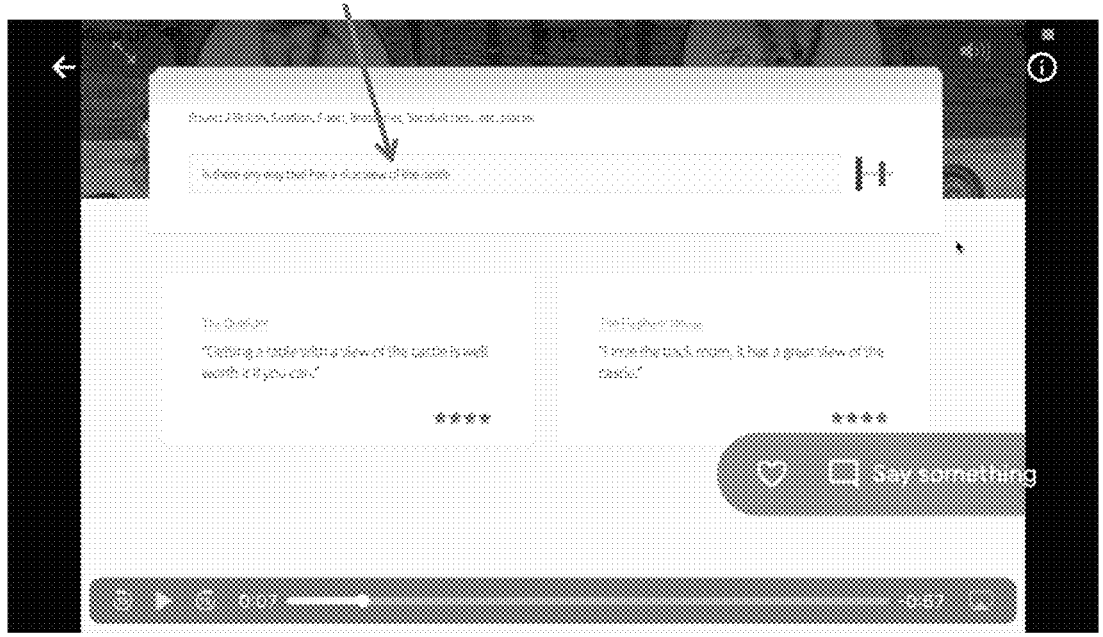
FIGS. 10(a) to 10(f) are screen shots showing a dialogue flow in accordance with an embodiment.

In FIG. 10(a), the user inputs speech commands into the system. The system can be operating on a mobile telephone or the like. The system provides an interface and requests the user to speak. In this embodiment, the system has either requested the user to input information concerning the location of interest to them or the system has determined the user's location from the location services of the telephone, for example, from GPS. In this example, the location is identified to be Edinburgh.

FIG. 10(a) is a picture of an input interface. The user utters the phrase "Is there any where that has a good view of the castle?" The system takes the user's input and converts it to text using an acoustic model. The text is displayed in box 1001.

Using the method described above with reference to FIGS. 3 and 4, the system identifies the two closest responses. In this specific example, these relate to the "The Outsider"—"Getting a table with a view of the castle is well worth it if you can" and "The Elephant House"—"I love the back room, it had a great view of the castle". In this specific example, the two closest responses are both displayed and outputted via a speech output. For the speech output, a phrase such as "I found a review of [enter restaurant name] saying" and then converting the text of the response into speech using an acoustic model. In an embodiment, only the response with the top similarity measure is output via speech synthesis. However, the other high scoring responses may be output visually as shown in FIG. 10(a).

Figure 10B:
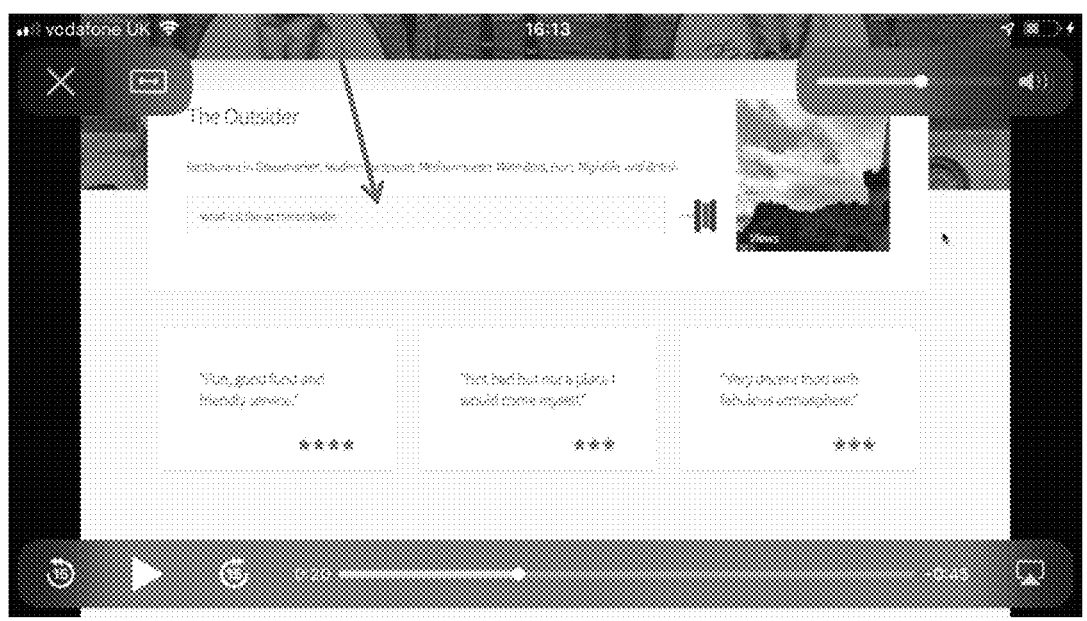

In FIG. 10(b), the user then follows up with the question "What's it like at the Outsider" which is again shown in box 1001. The system then runs the method of FIG. 4 again and looks for the responses with the highest similarity score out of the responses that relate to the outsider. The response with the highest similarity score is then output as synthesised speech. Again, this is prefaced by a phrase such as "one reviewer said". By using synthesised speech and an introduction to the phrase, the conversation flow with the user is very natural and easy.

Also, a figure has been retrieved as shown at 1003 that shows a view of the castle. This has been retrieved using the method described with reference of FIG. 4.

Figure 10C:
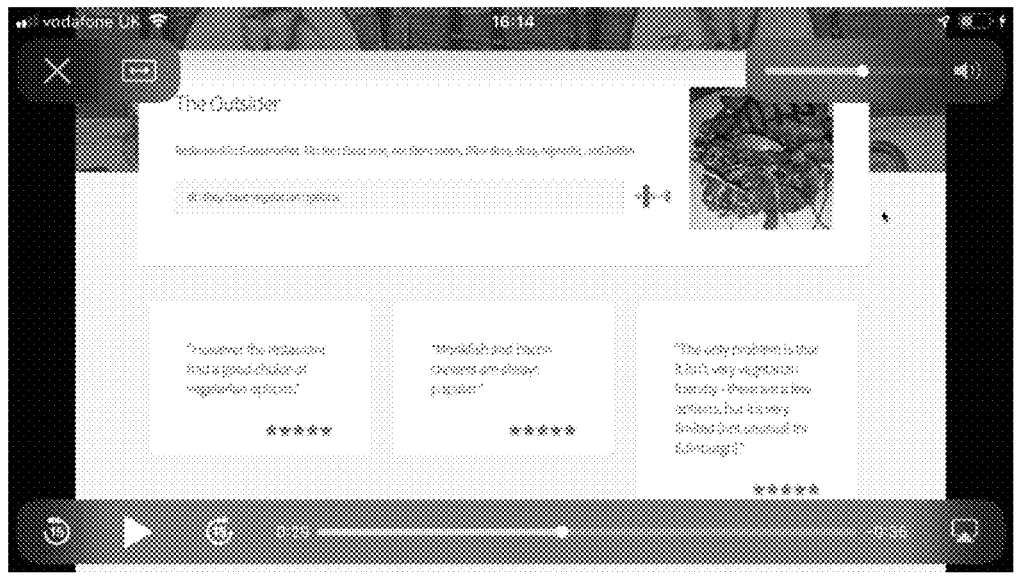

In FIG. 10(c), the user asks a further question "Do they have vegetarian options?" Even though the user has used quite imprecise language, the system is capable of returning responses such as: "However, the restaurant has a good choice of vegetarian options"; "Monkfish and bacon skewers are always popular"; and "The only problem is that it isn't very vegetarian friendly—there are a few options, but it's very limited (not unusual for Edinburgh)". The first of these options is then read out with an introduction such as "One reviewer noted . . . ".

Next, the user requests "Can I book a table for two people?" Following the process of FIG. 4, the system detects that this is a request for a booking and that the user is not looking for reviews and general info about the restaurant.

Figure 10D:
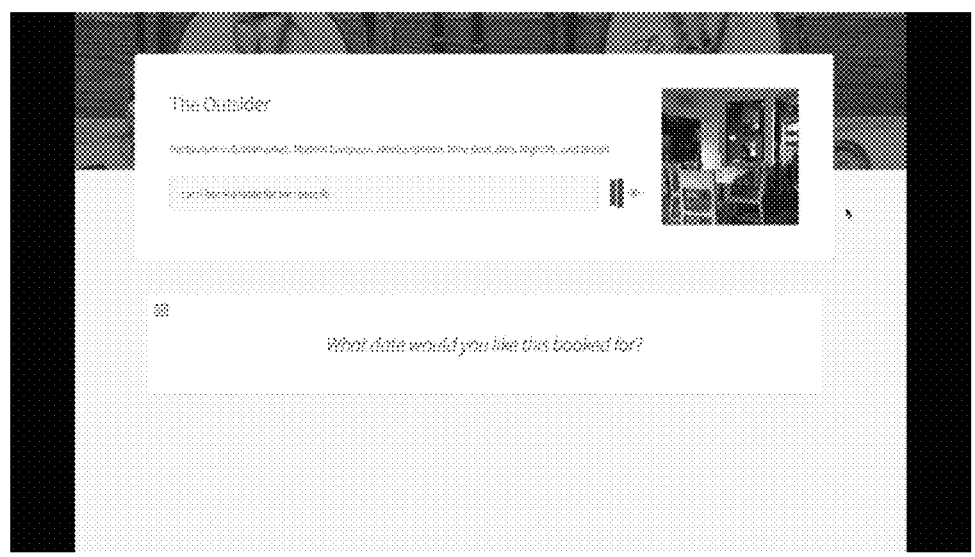
Figure 10E:
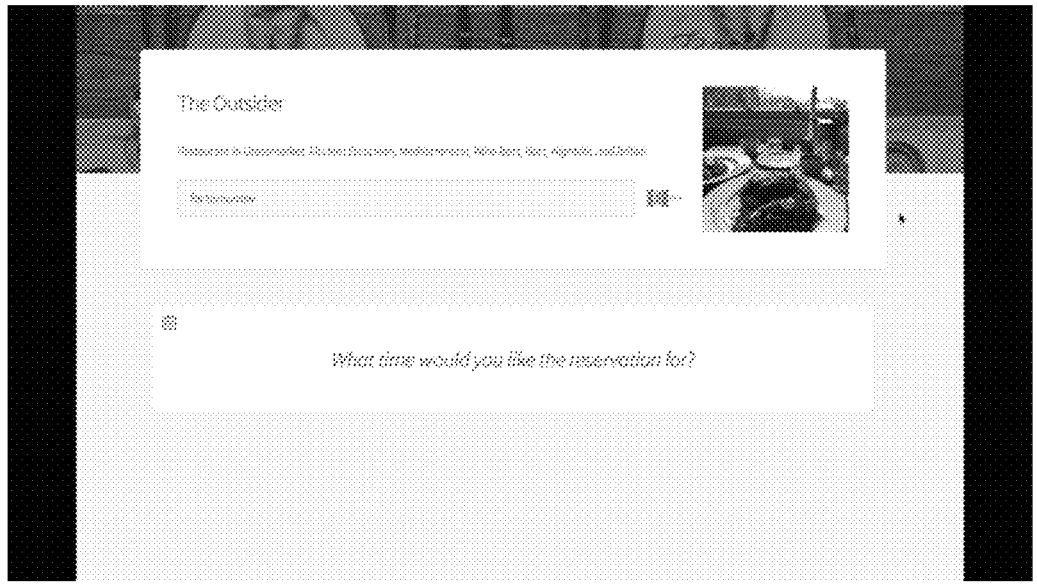
Figure 10F:
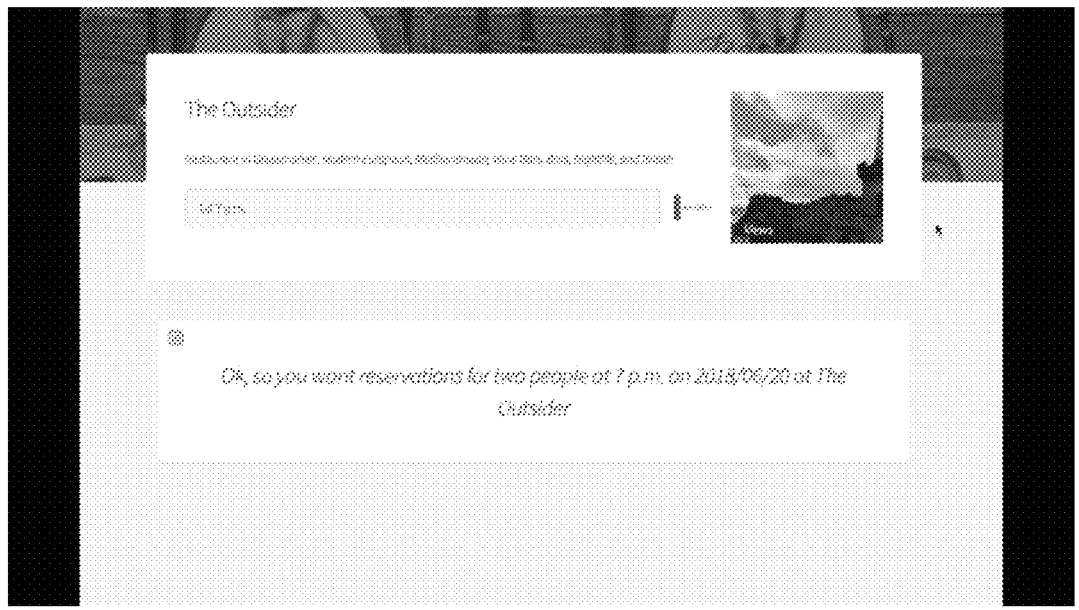

The system then, following the process of FIG. 4, switches to the booking dialogue and the system first requests the date of the requested booking in FIG. 10(d), then the time in FIG. 10(e) and finally in FIG. 10(f), then system confirms the date, time and no of people for the booking.

In an embodiment, once the system has collected the above information, it provides this information to a third party booking system to allow the table to be booked.

FIGS. 11(a) to 11(d) show screenshots from a specific example of a further dialogue flow. This example is also set in Edinburgh. Here, the user asks "What was the cafe where JK Rowling wrote Harry Potter?" Again, as explained with the Example of FIG. 10, the user's speech is converted to text as shown in window 1001.

The system then takes the text, converts it to a context vector as explained in 4. Next, the system looks for response vectors with a high similarity score. In this example, the system identifies the following responses regarding the Elephant House—"A lot of cafes are where JK Rowling wrote Harry Potter"; "We got to see the spot where it is said that JK Rowling wrote Harry Potter"; and "A far cry I would imagine before the Harry Potter craze". As these responses relate to "The Elephant House"—the interface shows the name of the restaurant at the top of the screen.

In the above embodiment, the system identifies the Elephant House as all top responses were related to the reviews attached to the Elephant House restaurant. In this case, the system will give a template response for just one entity. However, if the top 3 responses were from different restaurants, the template response would be for multiple entities and will state something like: "Check out these places . . . ."

The audio output synthesizes output for both the name of the restaurant and also the top response. In this example, the name of the restaurant and the top response are both output using introductory text such as "According to one reviewer of the Elephant House . . . a lot of cafes say that they are where JK Bowling wrote Harry Potter."

Figure 11A:
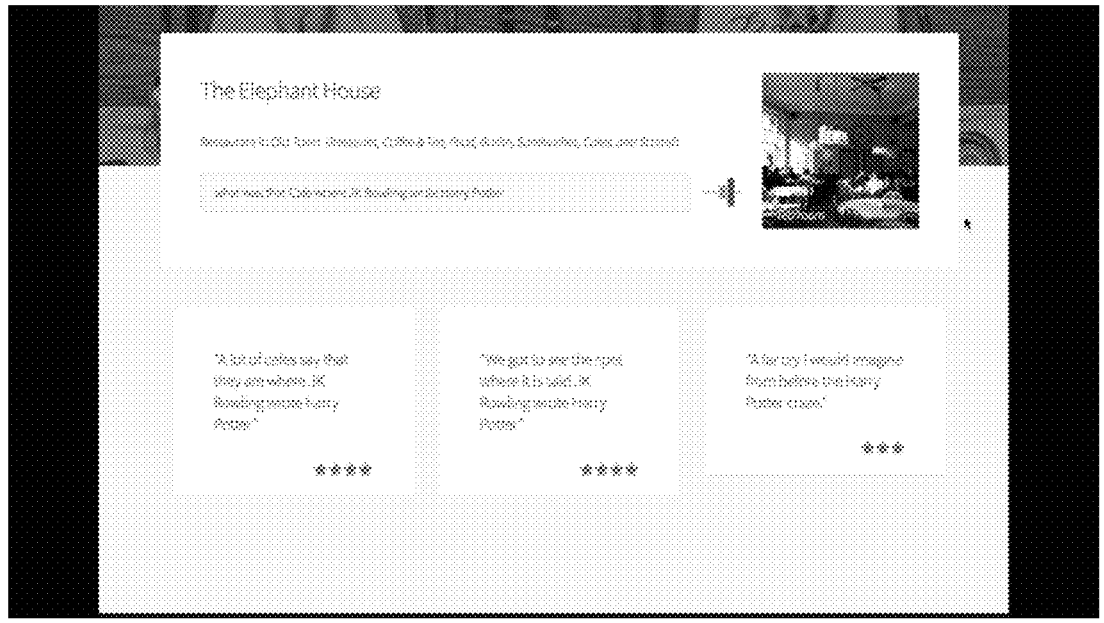
FIGS. 11(a) to 11(d) are screen shots showing a dialogue flow in accordance with an embodiment.
Figure 11B:
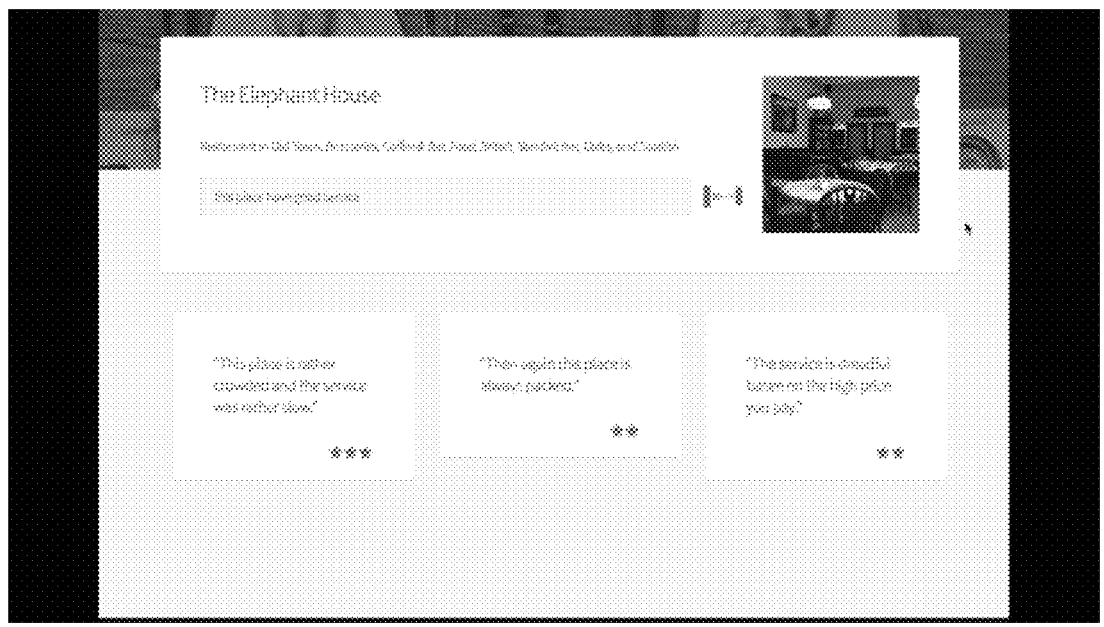

FIG. 11(b) then shows the follow-up questions where first the user asks "this place have good service?" This question although expressed in an imprecise manner, the system can still match it to responses received for the elephant house to produce the following responses: "This place is rather crowded and the service was rather slow."; "Then again this place is always packed"; and "The service is dreadful based on the high price you pay".

A picture of the cafe is also shown. This was derived using the system of FIG. 4.

Figure 11C:
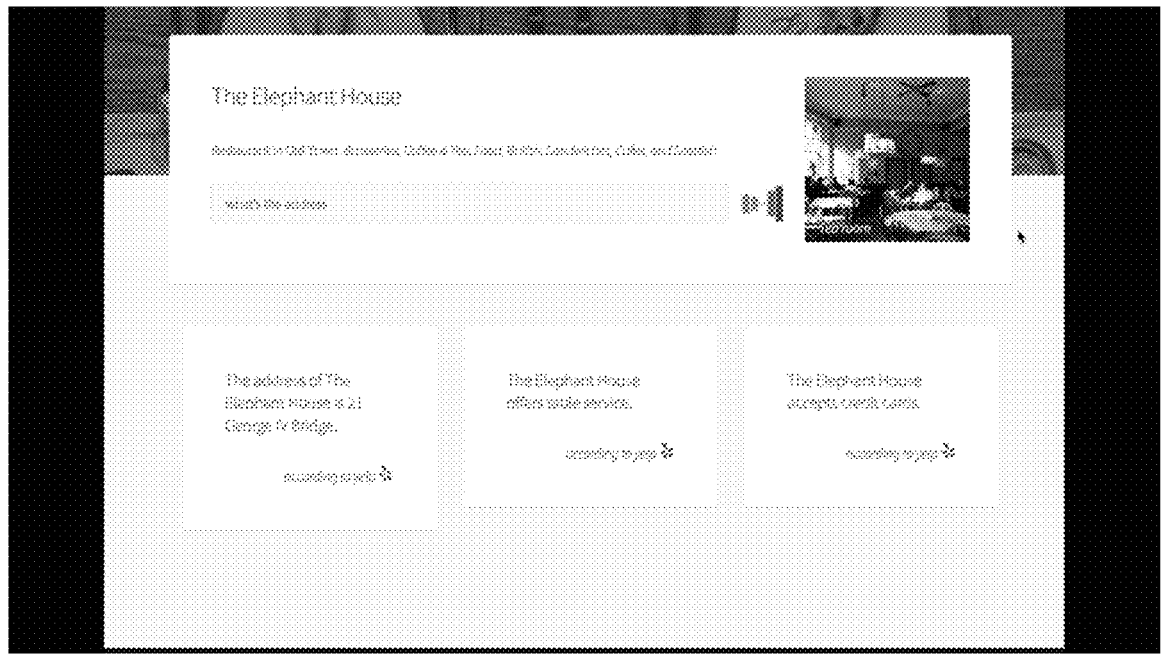

In FIG. 11(c), the user then requests the address "what's the address". It can be seen here that as the system is now searching responses for the address. Here, as the system is looking for facts as opposed to opinions, the responses returned are: "The address of The Elephant House is 21 George IV Bridge"; "The Elephant House offers table service"; and "The Elephant House accepts credit cards". All three of these responses are determined from a recommended source, for example from an independently verified source such as Yelp®.

Figure 11D:
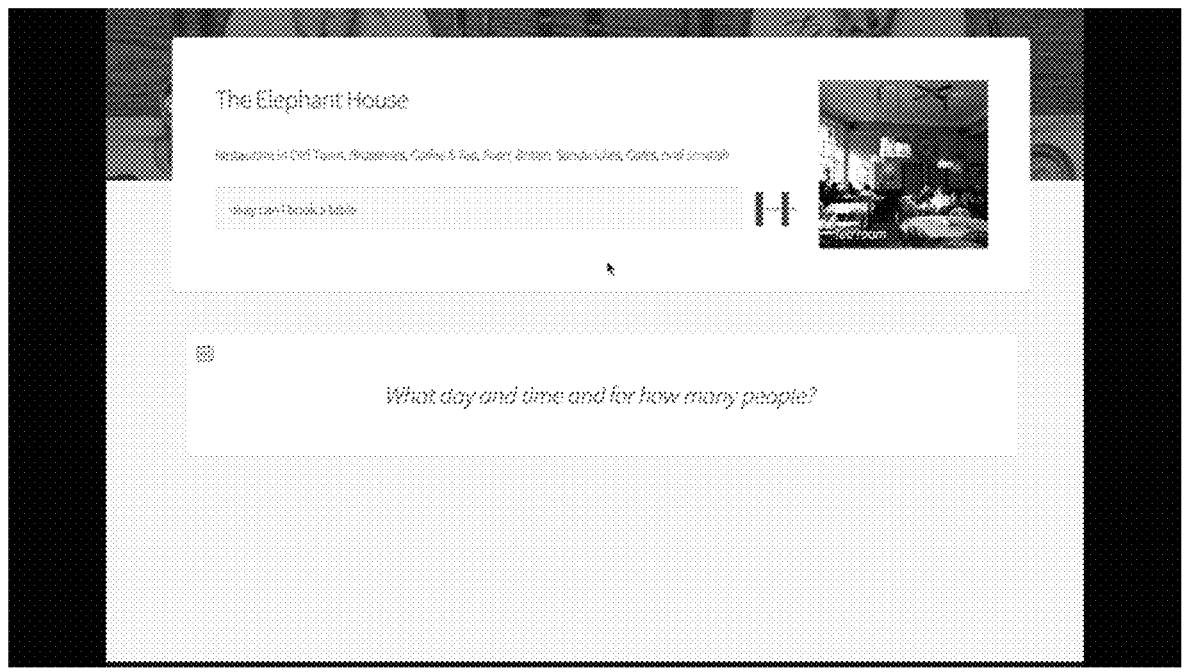

In FIG. 11(d), the user then asks to book a table and the booking process starts as described with reference to FIG. 4.

A final example in described with reference to the screen shots shown in FIGS. 12(a) to 12(g).

In this example, the user has identified the pub "The Flying Pig" in Cambridge and wishes to know some information about this pub. Here, in FIG. 12(a), the user asks "and do they have a happy hour?" This is again shown in box 1001 on the interface. Three responses are shown here: "The pub also offers craft keg beers"; "The menu has the standard pub fare plus some additional treats"; and "Met friends for drinks on a Thursday evening at 6 pm". All these responses are vaguely related to the question, but do not provide a clear answer to the user's question.

Figure 12A:
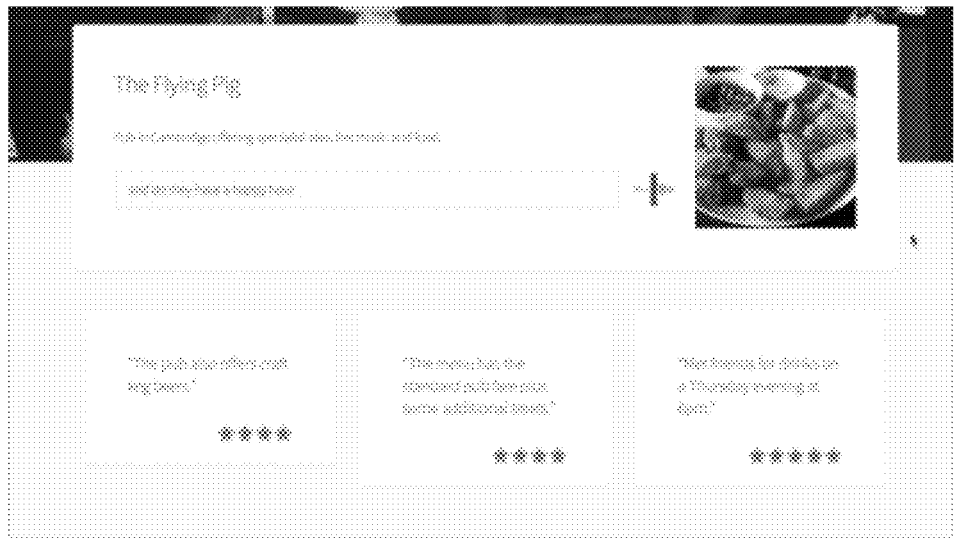
FIGS. 12(a) to 12(g) are screen shots showing a dialogue flow in accordance with an embodiment.
Figure 12B:
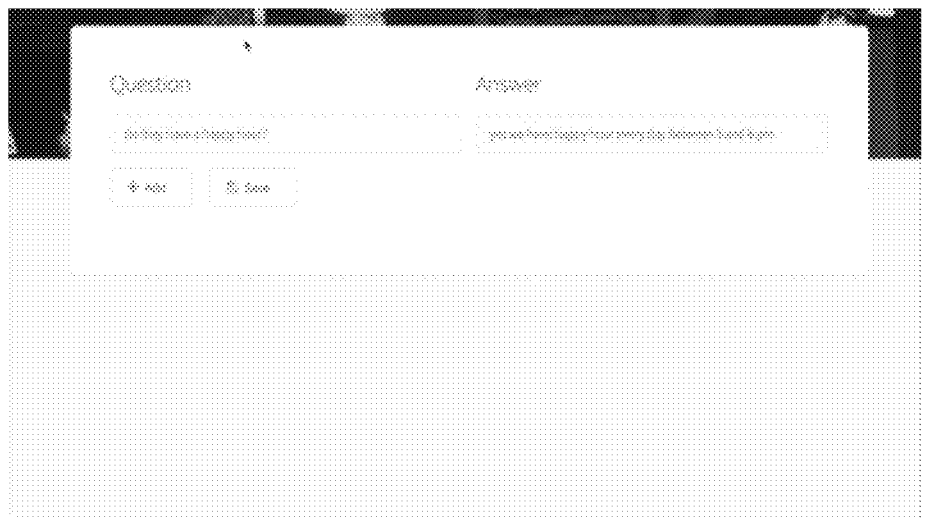

However, as shown in FIG. 12(b), the interface allows for specific answers to be provided by the subject of the review, in this case, the pub. Here, the "Flying Pig" sees a question from a user and supplies a specific response "yes we have happy hour every day between 5 and 6 pm".

Figure 12C:
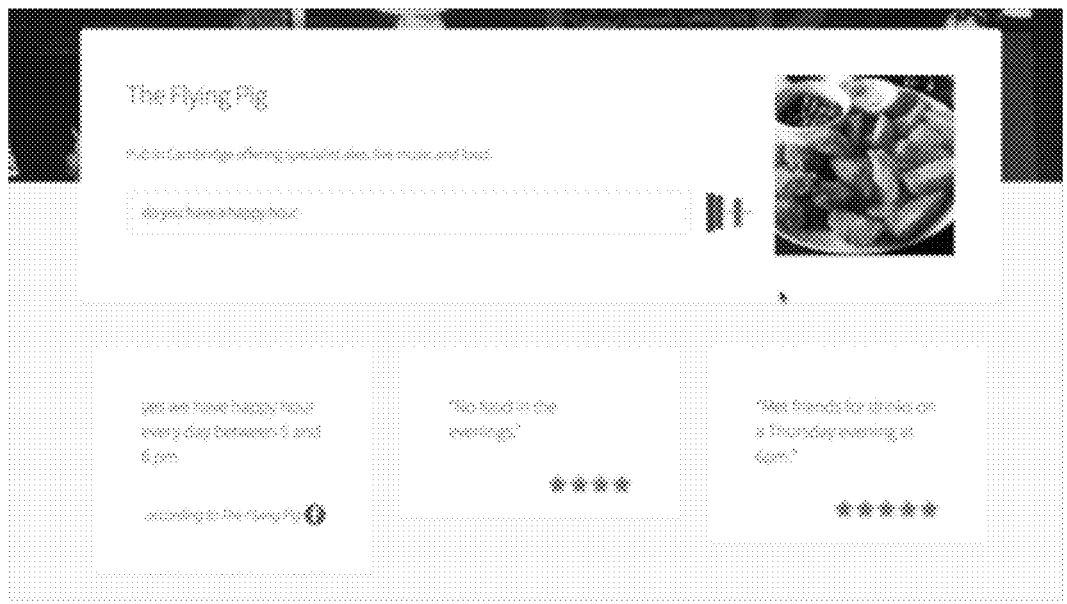

As can be seen in FIG. 12(c), this response provided by the pub is displayed with the other responses. However, this response supplied by the Flying Pig is defined as being from the Flying Pig both on the visual interface and in the output audio. When the owner of an establishment answers a question about the establishment, the response vector is set to have a very high similarity score to the context vector created for that question.

Figure 12D:
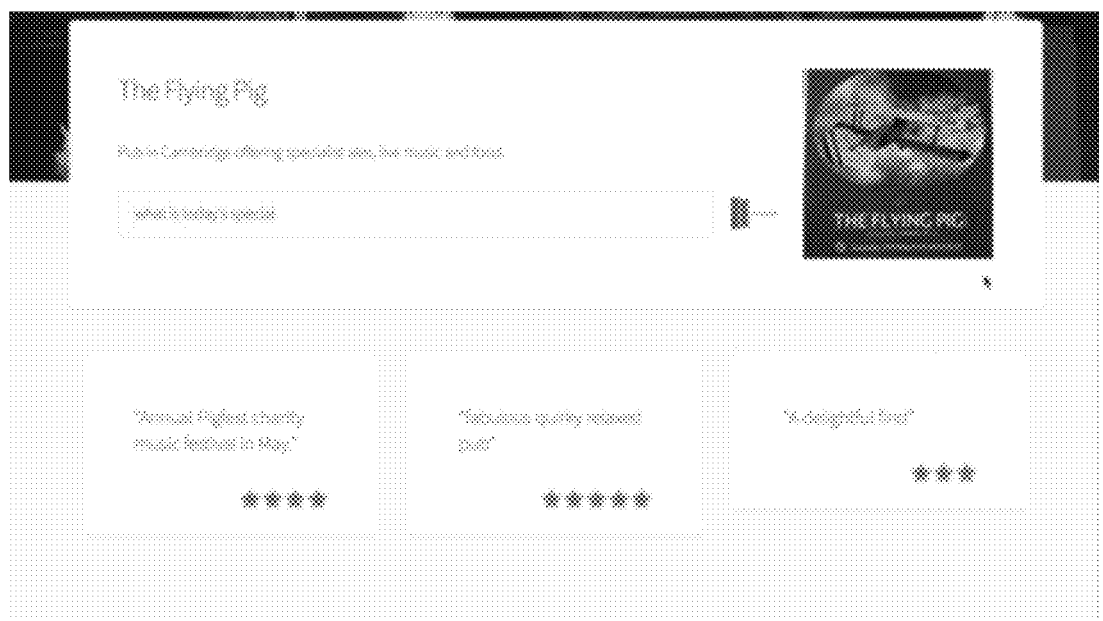
Figure 12E:
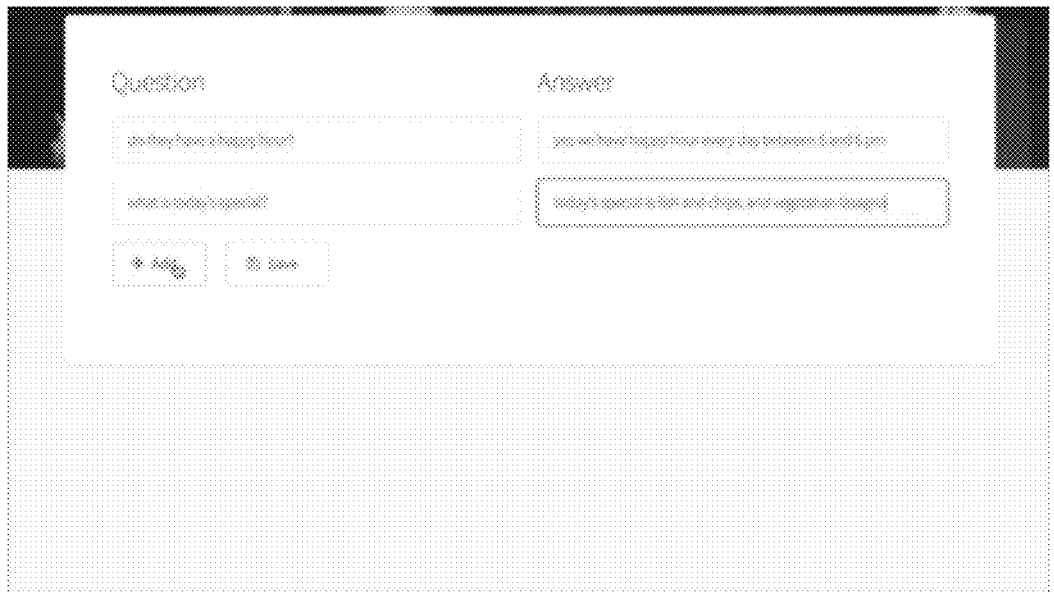
Figure 12F:
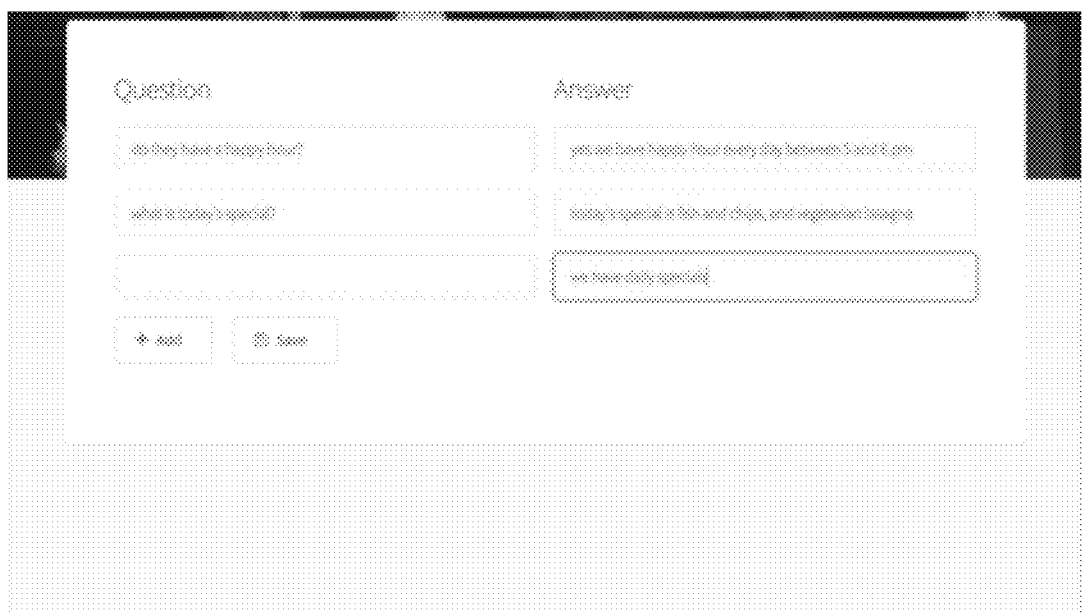
Figure 12G:
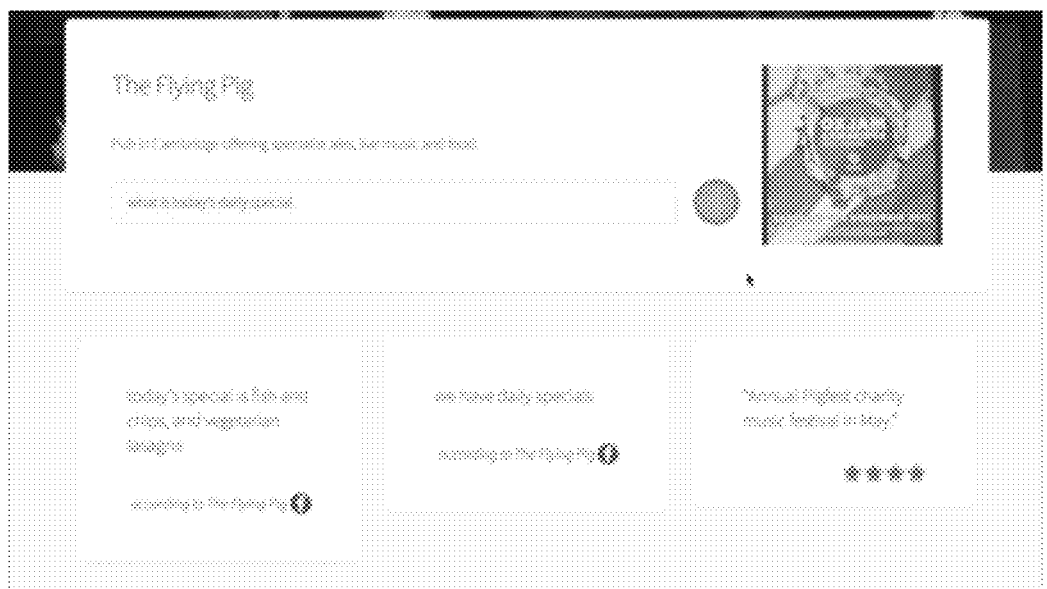

In the screenshot shown in FIG. 12(d), the user asks "what is today's special?" The responses for this question from user reviews are: "Annual Pigfest charity music festival in May"; "fabulous quirky relaxed pub"; and "a delightful find". However, none of the responses really answer the question. Here, as shown in FIG. 12(e), the pub can provide its own responses to add "Today's special is fish and chips and vegetarian lasagne". As shown in FIG. 12(f), it is possible for the flying pig to add more than one answer, here they also add "We have daily specials". As shown in FIG. 12(g), both responses from the Flying Pig are shown and are identified as being from the Flying Pig itself.

Implementations of the subject matter and the operations described in this specification can be realized in digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The above response retrieval system can be used in many different types of dialogue systems, for example, restaurant search (or any other search scenario such as search for movies and theatre shows, plane ticket search, FAQ database search), customer service and tourism support, e-banking, product search in e-commerce, etc.

While certain arrangements have been described, the arrangements have been presented by way of example only, and are not intended to limit the scope of protection. The inventive concepts described herein may be implemented in a variety of other forms. In addition, various omissions, substitutions and changes to the specific implementations described herein may be made without departing from the scope of protection defined in the following claims.

The invention claimed is:

1. A method of obtaining a response to a query inputted by a user, the method comprising:
   obtaining a training dataset comprising queries and corresponding responses;
   generating, using the training data set, a pre-trained model that comprises, for respective ones of the queries and corresponding responses of the dataset, a context vector for the query and a response vector for the response, wherein the response vector corresponds to the context vector for the query;
   receiving a user inputted query;
   encoding said query to produce a context vector;
   identifying, using the pre-trained model, responses having response vectors associated with the context vector;
   scoring the response vectors of the responses against the context vector to generate similarity scores for the response vectors, wherein the similarity score for a response vector and a context vector is a measure of a similarity between the context vector and the response vector;
   identifying, based on the similarity scores for the response vectors, responses that correspond to the user inputted query;
   outputting the responses that correspond to the user inputted query;
   receiving a further query;
   encoding said further query to produce a further context vector;
   producing a weighted context vector from a weighted sum of the further context vector from the further query and the context vector from a previous query, wherein the further context vector of the further query has a higher weighting than the context vector of the previous query;
   identifying, using the pre-trained model, further response vectors associated with the weighted context vector;
   scoring the further response vectors against the weighted context vector, wherein the scoring of a further response vector against the weighted context vector is a measure of a similarity between the weighted context vector and the further response vector; and
   identifying, based on the scoring of the further response vectors against the weighted context vector, further responses that correspond to the further query;
   outputting the further responses that correspond to the further query.

2. A method according to claim 1, wherein the responses are selected from phrases and images.

3. A method according to claim 1, wherein the scoring of the response vectors comprises a scaled cosine similarity scoring.

4. A method according to claim 1, wherein the outputted responses comprise at least one image and at least one phrase.

5. A method according to claim 1, further comprising passing the context vector through a classifier, wherein the responses are identified based on the output of the classifier.

6. A method according to claim 5, wherein the classifier is responsive to a request to re-start a query.

7. A method according to claim 6, wherein the classifier is responsive to a user requiring a service.

8. A method according to claim 1, wherein said user query relates to information about a plurality of entities and said responses relate to said plurality of entities, wherein the method is configured to output the responses from the highest ranked M entities, and wherein M is an integer of 2 or more.

9. A method according to claim 8, further comprising identifying the highest ranked M entities by:
   taking the closest N responses, where N is an integer of at least 3; and
   determining a total score for each entity by determining a value representing the score of each response and adding these values for each entity.

10. A method according to claim 9, wherein the method is adapted to receive a further query, said method further comprising:
    encoding said further query to produce a further context vector;
    identifying, using the pre-trained model, further response vectors associated with the further context vector, wherein the further response vectors are response vectors relating to the highest ranked M entities of a previous query; and
    identifying further responses associated with the further response vectors; and
    outputting the further responses.

11. A method according to claim 1, further comprising:
    subdividing said response vectors into clusters in a response vector space; and
    determining a cluster of the response vectors associated with the context vector,
    wherein the responses that correspond to the user inputted query are associated with the response vectors of the cluster.

12. A method according to claim 1, wherein the user input is a speech input and said speech input is converted to text.

13. A method according to claim 1, wherein the responses are output using speech synthesis.

14. A method according to claim 1, wherein the training dataset comprises comment and response pairs obtained by way of a social media platform.

15. A system for obtaining a response to a query inputted by a user, the system comprising an input interface, a processor and an output, the system being adapted to:
    obtain a training dataset comprising queries and corresponding responses;
    generate, using the training data set, a pre-trained model that comprises, for respective ones of the queries and responses of the dataset, a context vector for the query and a response vector for the response, wherein the response vector corresponds to the context vector for the query;
    receive a user inputted query using the input interface;
    encode said query to produce a context vector;
    identify, using the pre-trained model, responses having response vectors associated with the context vectors;
    score the response vectors of the responses against the context vector to generate similarity scores for the response vectors, wherein the similarity score for a response vector and a context vector is a measure of a similarity between the context vector and the response vector;
    identify, based on the similarity scores for the response vectors, responses that correspond to the user inputted query; output the responses that correspond to the user inputted query;
    receive a further query;
    encode said further query to produce a further context vector;

produce a weighted context vector from a weighted sum of the further context vector from the further query and the context vector from a previous query, wherein the further context vector of the further query has a higher weighting than the context vector of the previous query;

identify, using the pre-trained model, further response vectors associated with the weighted context vector;

score the further response vectors against the weighted context vector, wherein the scoring of a further response vector against the weighted context vector is a measure of a similarity between the weighted context vector and the further response vector; and identify, based on the scoring of the further response vectors against the weighted context vector, further responses that correspond to the further query;

output the further responses that correspond to the further query.

16. A non-transitory carrier medium comprising computer readable code configured to cause a computer to perform the following:

obtaining a training dataset comprising queries and corresponding responses;

generating, using the training data set, a pre-trained model that comprises, for respective ones of the queries and corresponding responses of the dataset, a context vector for the query and a response vector for the response, wherein the response vector corresponds to the context vector for the query;

receiving a user inputted query;

encoding said query to produce a context vector;

identifying, using the pre-trained model, responses having response vectors associated with the context vector;

scoring the response vectors of the responses against the context vector to generate similarity scores for the response vectors, wherein the similarity score for a response vector and a context vector is a measure of a similarity between the context vector and the response vector;

identifying, based on the similarity scores for the response vectors, responses that correspond to the user inputted query;

outputting the responses that correspond to the user inputted query;

receiving a further query;

encoding said further query to produce a further context vector;

producing a weighted context vector from a weighted sum of the further context vector from the further query and the context vector from a previous query, wherein the further context vector of the further query has a higher weighting than the context vector of the previous query;

identifying, using the pre-trained model, further response vectors associated with the weighted context vector;

scoring the further response vectors against the weighted context vector, wherein the scoring of a further response vector against the weighted context vector is a measure of a similarity between the weighted context vector and the further response vector; and identifying, based on the scoring of the further response vectors against the weighted context vector, further responses that correspond to the further query;

outputting the further responses that correspond to the further query.

* * * * *

UNITED STATES PATENT AND TRADEMARK OFFICE
CERTIFICATE OF CORRECTION

| | |
|---|---|
| PATENT NO. | : 10,664,527 B1 |
| APPLICATION NO. | : 16/251677 |
| DATED | : May 26, 2020 |
| INVENTOR(S) | : Matthew Steedman Henderson et al. |

It is certified that error appears in the above-identified patent and that said Letters Patent is hereby corrected as shown below:

On the Title Page

Item (72) Inventors should read:
Matthew Steedman Henderson, Singapore (SG);
Pei-Hao Su, London (GB);
Nikola Mrksic, London (GB);
Tsung-Hsien Wen, London (GB);
Iñigo Casanueva Perez, London (GB);
Ivan Vulic, London (GB);
Georgios Spithourakis, London (GB);
Samuel John Coope, London (GB);
Pawel Budzianowski, London (GB);
Daniela Susanne Gerz, London (GB)

Signed and Sealed this
Twenty-third Day of January, 2024

Katherine Kelly Vidal
*Director of the United States Patent and Trademark Office*